US011542942B2

(12) United States Patent
Hahn et al.

(10) Patent No.: US 11,542,942 B2
(45) Date of Patent: Jan. 3, 2023

(54) DYNAMIC RADIAL COMPLIANCE IN SCROLL COMPRESSORS

(71) Applicant: HITACHI-JOHNSON CONTROLS AIR CONDITIONING, INC., Tokyo (JP)

(72) Inventors: Greg Hahn, Tokyo (JP); Joe Hill, Tokyo (JP); Jianhui Peng, Tokyo (JP); Gene Fields, Wichita, KS (US)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 279 days.

(21) Appl. No.: 16/922,277

(22) Filed: Jul. 7, 2020

(65) Prior Publication Data

US 2020/0332797 A1 Oct. 22, 2020

Related U.S. Application Data

(63) Continuation of application No. PCT/US2018/020254, filed on Feb. 28, 2018.

(51) Int. Cl.
*F04C 18/02* (2006.01)
*F04C 29/00* (2006.01)

(52) U.S. Cl.
CPC ...... *F04C 18/0215* (2013.01); *F04C 29/0021* (2013.01); *F04C 29/0057* (2013.01); *F04C 2240/807* (2013.01)

(58) Field of Classification Search
CPC .............. F04C 18/0215; F04C 29/0021; F04C 29/0057; F04C 2240/807; F16F 15/28
See application file for complete search history.

(56) References Cited

U.S. PATENT DOCUMENTS

| 4,439,118 | A | 3/1984 | Iimori |
| 4,518,324 | A | 5/1985 | Mizuno et al. |
| 4,597,724 | A | 7/1986 | Sato et al. |
| 5,137,437 | A | 8/1992 | Machida et al. |
| 5,174,738 | A | 12/1992 | Baumann et al. |
| 5,199,862 | A | 4/1993 | Kondo et al. |
| 5,366,360 | A | 11/1994 | Bookbinder et al. |
| 5,452,995 | A | 9/1995 | Izumi et al. |

(Continued)

OTHER PUBLICATIONS

International Search Report of and Written Opinion of PCT/US2018/020254 dated May 7, 2018.

*Primary Examiner* — Mary Davis
(74) *Attorney, Agent, or Firm* — Mattingly & Malur, PC

(57) ABSTRACT

In some examples, a scroll compressor may include an orbiting scroll and a fixed scroll having spiral involutes intermeshed together. A slider block may be disposed on the eccentric portion of a main shaft and the slider block may be attached to a compliant counterweight. The counterweight may be supported by a counterweight guide plate that is supported by the main shaft. The counterweight guide plate may also have an arm securing a top portion of the counterweight thereby securing the slider block. In some implementations, a spring assembly may be provided between an outer edge of the counterweight and the counterweight guide plate. These components may, in part, allow for a constant involute contact between the fixed scroll and orbiting scroll involutes at high speeds thereby achieving high compression efficiency.

16 Claims, 22 Drawing Sheets

(56) References Cited

U.S. PATENT DOCUMENTS

| | | | |
|---|---|---|---|
| 5,536,152 A | 7/1996 | Kawahara et al. | |
| 5,562,436 A | 10/1996 | Kawahara et al. | |
| 5,582,513 A | 12/1996 | Shigeoka et al. | |
| 5,807,089 A | 9/1998 | Tsumagari et al. | |
| 6,089,840 A | 7/2000 | Iizuka et al. | |
| 9,377,022 B2 | 6/2016 | Ignatiev et al. | |
| 10,208,750 B2 * | 2/2019 | Kawamura | F04C 18/0215 |
| 11,193,488 B2 * | 12/2021 | Fukuhara | F04C 18/0215 |
| 2012/0244026 A1 | 9/2012 | Hahn et al. | |
| 2014/0356209 A1 | 12/2014 | Ignatiev et al. | |
| 2015/0037185 A1 | 2/2015 | Rood et al. | |

\* cited by examiner

DYNAMIC RADIAL COMPLIANCE IN SCROLL COMPRESSORS

CROSS-REFERENCE TO RELATED APPLICATION

This application is a continuation application of PCT/US2018/020254, filed on Feb. 28, 2018, the entire contents of which are incorporated herein by reference.

TECHNICAL FIELD

This disclosure relates to the technical field of radial compliance of scroll compressors.

BACKGROUND

Scroll compressors are widely used in refrigerant compression applications including variable refrigerant flow (VRF) systems. Scroll compressors may include a fixed scroll and an orbiting scroll that fit together as an intermeshing pair of spiral involutes, that form crescent shaped pockets of refrigerant gas during operation. Scroll compressors may also include a main shaft or crank shaft with an eccentric journal or pin for orbiting the orbiting scroll. In general, during operation, suction gas enters the compressor and then enters an outside perimeter of the scroll pair. The pockets reduce in volume as the orbiting motion occurs, and this compresses the gas to a higher pressure. In some implementations, near the center section, the compression pockets reach the discharge port in the fixed scroll and the high pressure gas exits out the top of the fixed scroll. The high pressure discharge gas may also generally flow downward, between the pump cartridge and the housings, and then exit the compressor. VRF scroll compressors are essentially all high side, which means suction gas enters directly into the compression chamber and most of the volume inside the compressor housing is at discharge pressure.

Radial compliance in scroll technology allows the scroll set (e.g., the orbiting scroll and fixed scroll) to establish the eccentric offset of the shaft journal for the orbiting scroll by maintaining involute wall contact throughout compression.

SUMMARY

Some implementations include arrangements and techniques for achieving dynamic radial compliance of a scroll compressor at variable speeds. For example, a scroll compressor comprise a drive shaft extending along a main axis including a shaft eccentric having a smaller diameter than a diameter of the drive shaft; a slider block disposed on the shaft eccentric; an orbiting scroll disposed on the slider block having a base plate and a spiral wrap extending axially from the orbiting scroll base plate; a fixed scroll having a base plate, a spiral wrap extending axially from the fixed scroll base plate and nested with the spiral wrap of the orbiting scroll; a counterweight having a bore that engages with the slider block; a counterweight guide plate supporting the counterweight and having a bore that engages with the drive shaft, wherein the counterweight includes a first surface perpendicular to the main axis that faces upward, and wherein the counterweight guide plate includes a second surface perpendicular to the main axis and parallel to the first surface and that faces the first surface.

BRIEF DESCRIPTION OF THE DRAWINGS

The detailed description is set forth with reference to the accompanying figures. The use of the same reference numbers in different figures indicates similar or identical items or features.

DESCRIPTION OF THE EMBODIMENTS

Scroll compressors typically include a fixed or non-orbiting scroll and an orbiting scroll coupled to a main shaft that is driven by a motor. The fixed and orbiting scrolls fit together as an intermeshing pair of spiral involutes. Under high loads the main shaft of variable speed scroll compressors can experience bending. The load includes both a gas pressure force and, at very high speeds, for example, a centrifugal force of the orbiting scroll mass. During variable speed operation optimum compression is achieved, in part, by maintaining appropriate involute contact between the fixed scroll and the orbiting scroll. Further, one objective of variable speed compressors may be to normalize the scroll flank force to be more constant at all speeds.

Figure 1:
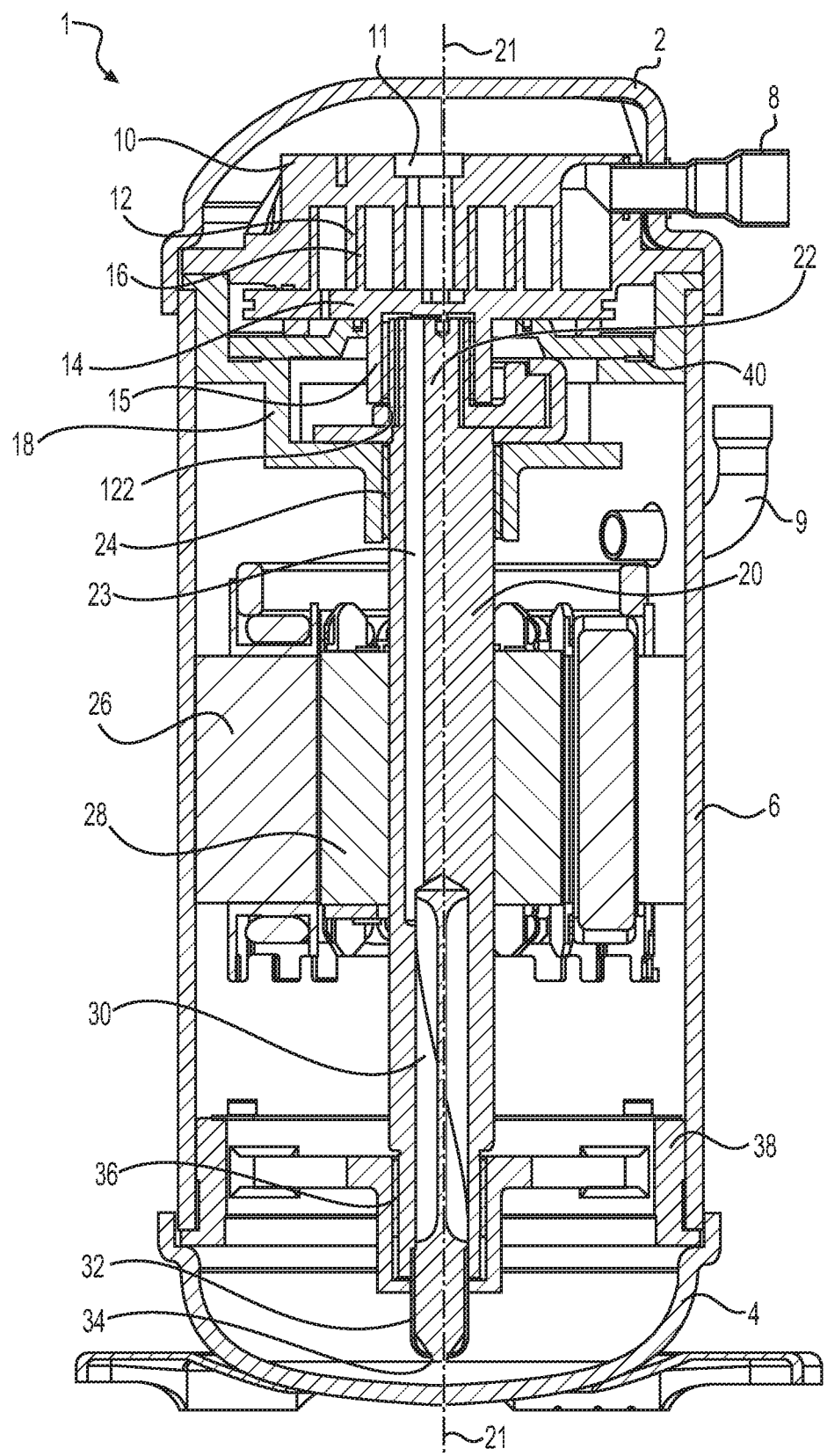
FIG. 1 illustrates an example of a cross-sectional view of a scroll compressor according to some implementations.

The techniques discussed herein provide radial compliance to produce a relatively constant involute wall contact regardless of operating condition and speed. FIG. 1 illustrates an example of a cross-sectional view of a scroll compressor 1 according to some implementations. The body or housing of the compressor may include an upper cap 2, center shell 6, and lower cap and base 4. These components may be pressed fit together. The upper cap 2, center shell 6, and lower cap 4 may have generally circular profiles. The lower cap 4 may essentially be bowl-shaped having vertical extending edges or rims that are essentially parallel to the main axis 21. The lower cap 4 may have an open end or face into which components of the compressor are assembled or disposed. The center shell 6 may essentially be cylindrical having an axis parallel to the main axis 21 and may be concentric to the bore(s) of the one or more bearings on the main shaft or drive shaft 20, such as the main bearing 24 and lower bearing 36. The center shell 6 has open top and bottom ends and may be referred to as a "case." The upper cap 2 may essentially be a bowl-shaped having vertical edges or rims that are essentially parallel to the main axis 21. The upper cap 2 has an open end or face which houses components of the compressor once pressed in place during assembly that may include, for example, components of the compression mechanism or compression unit, such as an orbiting scroll 14 and fixed scroll 10 and associated components. The center shell 6 may be sheet metal or steel tubing or the like. The upper cap 2, center shell 6, and lower cap 4 may be made of low carbon steel. Further the scroll compressor 1 may be hermetically sealed from the ambient surroundings, but the techniques described herein may also be applied to a semi-hermetic scroll design, without loss in performance.

A suction inlet 8 may be disposed in the upper cap 2 to suction a refrigerant gas or a liquid or a mixture of liquid and gas. Further, a discharge outlet 11 may be disposed in a top portion of the fixed scroll 10. In the example shown in FIG. 1 the refrigerant liquid is suctioned directly into the compression chamber formed by the intermeshing of involutes of the fixed scroll 10 and orbiting scroll 14, and most of the interior of the housing is at a discharge pressure, which may be known as a "high side" compressor. However, this example and the techniques disclosed herein may be applied to compressors that are "low side" in which most of the interior of the housing is at a suction pressure.

A drive shaft or main shaft 20 is aligned and may be supported by a main bearing 24 and/or a lower bearing 36, such that the main axis 21 may be rotated up to very high speeds by a rotor 28. The main shaft 20 may rotate around a main axis 21 and the rotor 28 may be disposed between the main bearing 24 and lower bearing 36 and may be press fit onto the main shaft 20 to align concentrically with the stator 26. An upper counterweight may also be shown above the rotor 28. Upon operation, the stator 26 imparts a magnetic field such that the rotor 28 will spin and produce high power for compressing the gas in the compression unit, e.g., compression pockets of gas formed by the intermeshing of the spiral involute 12 of the fixed scroll 10 and the spiral involute 16 of the orbiting scroll 14 upon operation. The motor (e.g., rotor 28 and stator 26) may contain a special winding design for the stator 26, as well as a rotor 28 with permanent magnets.

A lubricant such as oil from the lower portions of the assembly (e.g., lower cap 4) is drawn up a passage 23 inside the shaft 20. The lubricant may be is used to lubricate the lower bearing 36, main bearing 24, and orbiting scroll bearing 142. In addition, there are orbiting thrust surfaces which require lubrication. In some implementations a lubricant pickup tube 30 with an opening 34 may extend in an axial direction toward the lower cap 4 from the main shaft 20 and suction a lubricant as the main shaft 20 rotates.

FIG. 1 further shows an eccentric pin or journal 22 that may extend axially from one end (e.g., upper end) of the main shaft 20 that may be driven by the motor to thereby impart orbital motion to the orbiting scroll 14. A slider block 122 may also be disposed which, in some implementations may be a sintered, hardened, and ground component, which forms a journal for the orbiting scroll bearing 142.

In general, and as mentioned above, when revolving the orbiting scroll 14 by driving the motor components (e.g., rotor 28, stator 26), a refrigerant gas passes through the suction inlet 8, and is guided into a compression chamber formed by the involutes of the orbiting scroll 14 and the fixed scroll 10. Then, the refrigerant gas in the compression chamber is reduced in volume to be compressed as it moves toward the center between the orbiting scroll 14 and the fixed scroll 10. The compressed refrigerant gas may be discharged from a discharge port 11 of the fixed scroll 10. The compressed refrigerant gas may also be discharged through small bypass valves, strategically located inside the fixed scroll involute floor, and connected directly to the discharge chamber.

The material of the orbiting scroll may be a high strength and high stiffness and lighter weight material that enables the involute walls and other sections to be thinner than conventional involute structures thereby producing higher displacement in the same package size. This also minimizes the mass of the orbiting scroll. Materials such as ductile iron (300) having a stiffness of 25000 kips per square inch (ksi) and a tensile of 300 ksi and G40 cast iron having a stiffness of 15000 ksi and a tensile of 40 ksi may be used for the orbiting scroll and for the fixed scroll.

Figure 2:
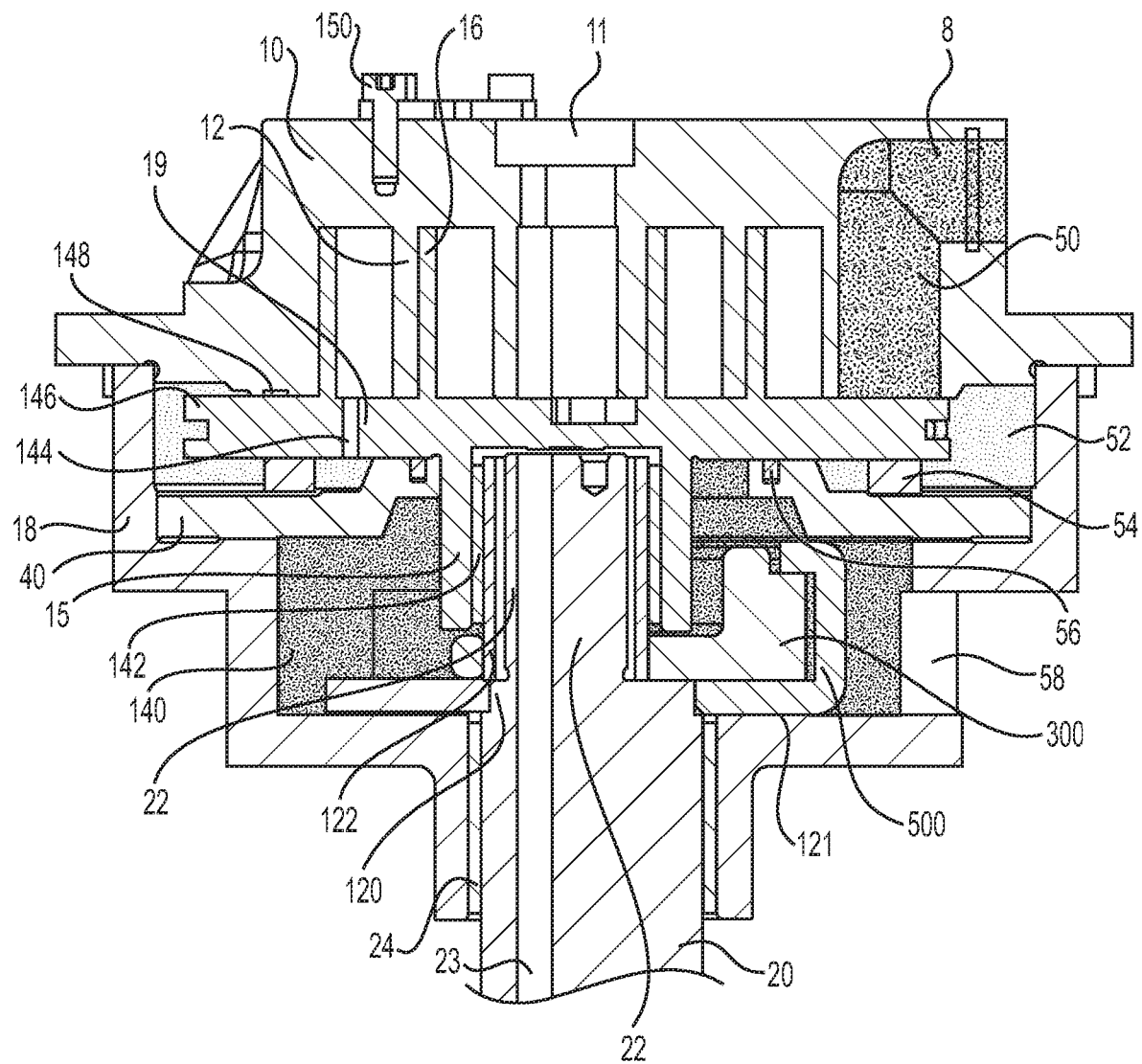
FIG. 2 illustrates an example of a portion of a cross-sectional view of a scroll compressor according to some implementations.

FIG. 2 illustrates an example of a portion of a cross-sectional view of a scroll compressor 1 according to some implementations. As shown, the slider block 122 may be disposed on the shaft eccentric 22 and may transmit force from the shaft eccentric 22 to the orbiting scroll 14. The slider block 122 may interface with one or more orbital scroll bearings 142, which support a hub 15 of the orbiting scroll 14. In some implementations, the slider block 122 may be driven by a flat section 125 on the eccentric pin 22, which may be referred to as an eccentric drive flat 125 (shown in better detail in FIG. 7). The shaft eccentric 22 and eccentric drive flat 125 may transfer rotating motion of the main shaft 20 to a corresponding flat surface 124 of the slider block 122, which in turn drives the orbiting motion of the orbiting scroll 14. As mentioned above, and seen in more detail in FIG. 2, on an upper surface side of the orbiting scroll plate 146 a spiral involute 16 is disposed which intermeshes a spiral involute 12 of the fixed scroll 10. On an outboard surface side opposite to the upper surface side, a hub portion 15 may be disposed which may be coupled to the slider block 122 through one or more orbiting scroll bearings 142. The bearing insert may be pressed into the hub of the orbiting scroll 15. Then, it may be bored precisely with the centerline of the axis. The bearing insert has a small clearance when inserted over the shaft journal. The eccentric (either shaft 20 or slider block 122) rotates the orbiting scroll 14 in a circle that's equal to 2× eccentric. In the case of radial compliance slider block 122, the circle is defined by the geometry of the scroll spiral.

The relative orbiting movement between the orbiting scroll 14 and the non-orbiting fixed scroll 10 may be realized by Oldham coupling 54 that may be provided below the orbiting scroll plate 146. One function of the Oldham coupling 54 is to maintain X-Y axis alignment of both scroll involute mathematical curves of parts 14, 16 of the fixed scroll 10 and orbiting scroll 14. X-Y axis alignment may be accomplished by a direct connection between the orbiting scroll and main frame then an aligned connection between the main frame to the fixed scroll.

A compliant or movable counterweight 300 may be attached to the slider block 122 that essentially offsets the mass of the orbiting scroll 14. A significant drive angle inside the slider block 122 applies a component of the tangential compression gas force Ftg, to the scroll flank force Ffl. A counterweight guide plate 500 may be disposed and may be pressed onto the upper section of the drive shaft 20. The counterweight guide plate 500 may be mounted perpendicular to the shaft axis 21. The slider block 122 may be press fit into the compliant counterweight 300, into a bore 316, for example, with radial alignment related to a flat surface 124 inside the slider block 122 and axial alignment related to the lower end of the slider block 122. Further, it is preferable to have perpendicularity of the slider block 122 axis and a stabilizing surface of the compliant counterweight 300 (e.g., upward facing surface 320). The stabilizing surface will be explained in more detail below with reference to FIGS. 3 and 4.

FIG. 2 further shows a stepped diameter portion 120 of the main shaft 20, which is a portion of the main shaft 20 having a smaller diameter than a main portion of the shaft 20. In some implementations, the stepped diameter portion 120 may form a shoulder or corner portion on which a lower surface of the counterweight guide plate 500 may be disposed. Further, the stepped portion 120 may have a diameter greater than the diameter of the shaft eccentric 22 and the stepped diameter portion 120 of the main shaft 20 may be disposed lower than the shaft eccentric 22 in the axial direction. Further, the counterweight guide plate 500 may be press fit onto the step diameter 120 of the drive shaft to be supported by the stepped portion 120. In some examples, the counterweight guide plate 500 is a stamped metal part that is then machined. Further, in some implementations, the stepped portion 120 may support the counterweight guide plate 500 such that there may be a gap or clearance 121 between the counterweight guide plate 500 and a portion of an upper surface of the main frame 18. Additionally, in some implementations, the guide plate 500 may have a radial alignment to the shaft eccentric 22 and slider block drive flat 124. Correspondingly, the compliant counterweight 300 may have the same radial alignment with the slider block drive flat 124.

Further, at least one intermediate pressure seal 56 may be disposed in an axial compliance seal plate 40. The axial compliance seal plate 40 may be used to locate and maintain the seal during assembly. As mentioned above, during operation, as the suction gas is compressed, the pressure increases until it exits from a discharge outlet 11 disposed in the top of the fixed scroll 10. During this process, the high internal pressure force may separate the fixed scroll 10 and orbiting scroll 14 apart in the axial direction, if not for axial compliance. In some instances, axial compliance relates to applying a gas pressure force to either a lower surface of the orbiting scroll 14 or the fixed scroll 10. This force may include a combination of two sources, beginning with discharge pressure 140 applied to the exposed inside diameter area of the intermediate pressure seal 56. A second force may be an intermediate pressure 52 applied to the area from the outside diameter of the intermediate pressure seal 56 to the scroll contact ring 148. This is the outer precision surface of the fixed scroll 10, where it makes contact with the corresponding surface of the orbiting scroll plate 146. In general, intermediate gas pressure 52 is outside the scroll contact ring 148 and suction gas pressure is inside the scroll contact ring 148. The resultant applied gas force is combined with the discharge gas pressure force 140. In some implementations, there is only one area for the applied gas force, but it is a combination of intermediate gas and discharge gas pressures. For example, a portion of the applied force in axial compliance is a function of discharge pressure; and the remaining portion of the applied force must be a function of intermediate pressure. Intermediate pressure may simply be compressed suction gas. For example, the total force maintains axial contact between the orbiting scroll 14 and the fixed scroll 10, throughout the orbit, the speed, and the operating envelope.

Further, the orbiting scroll 14 is compliant but is forced into radial contact with the fixed scroll 10 at the involute flank contact points. The orbiting scroll 14 is also forced into axial contact with the fixed scroll 10, such that the tip and floor of each involute makes contact. Further, an intermediate pressure port 144 may be disposed in the orbiting scroll plate 146 to allow passage of a fluid at an intermediate pressure 52.

Figure 3:
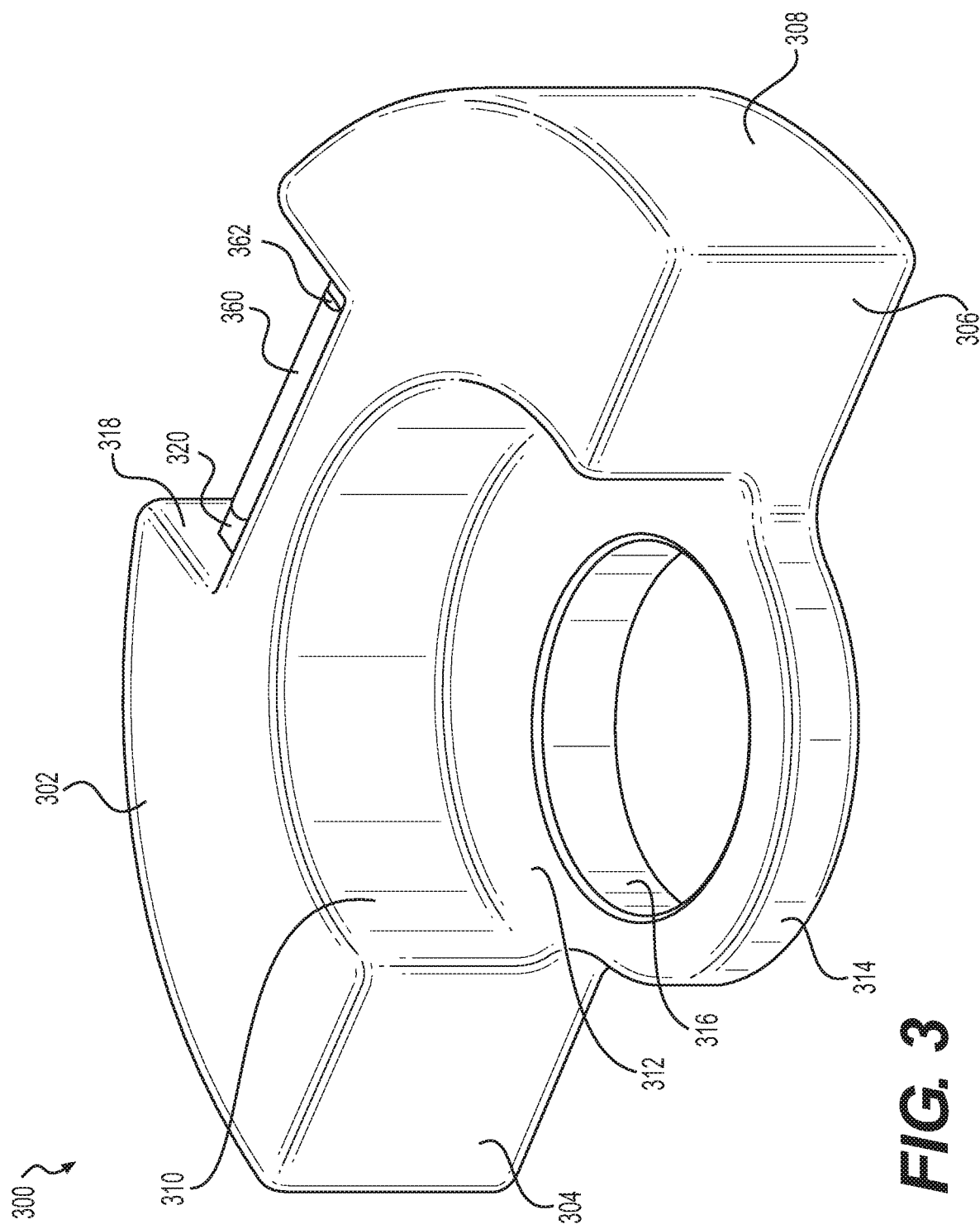
FIG. 3 illustrates an example of a perspective view of a compliant counterweight according to some implementations.
Figure 4:
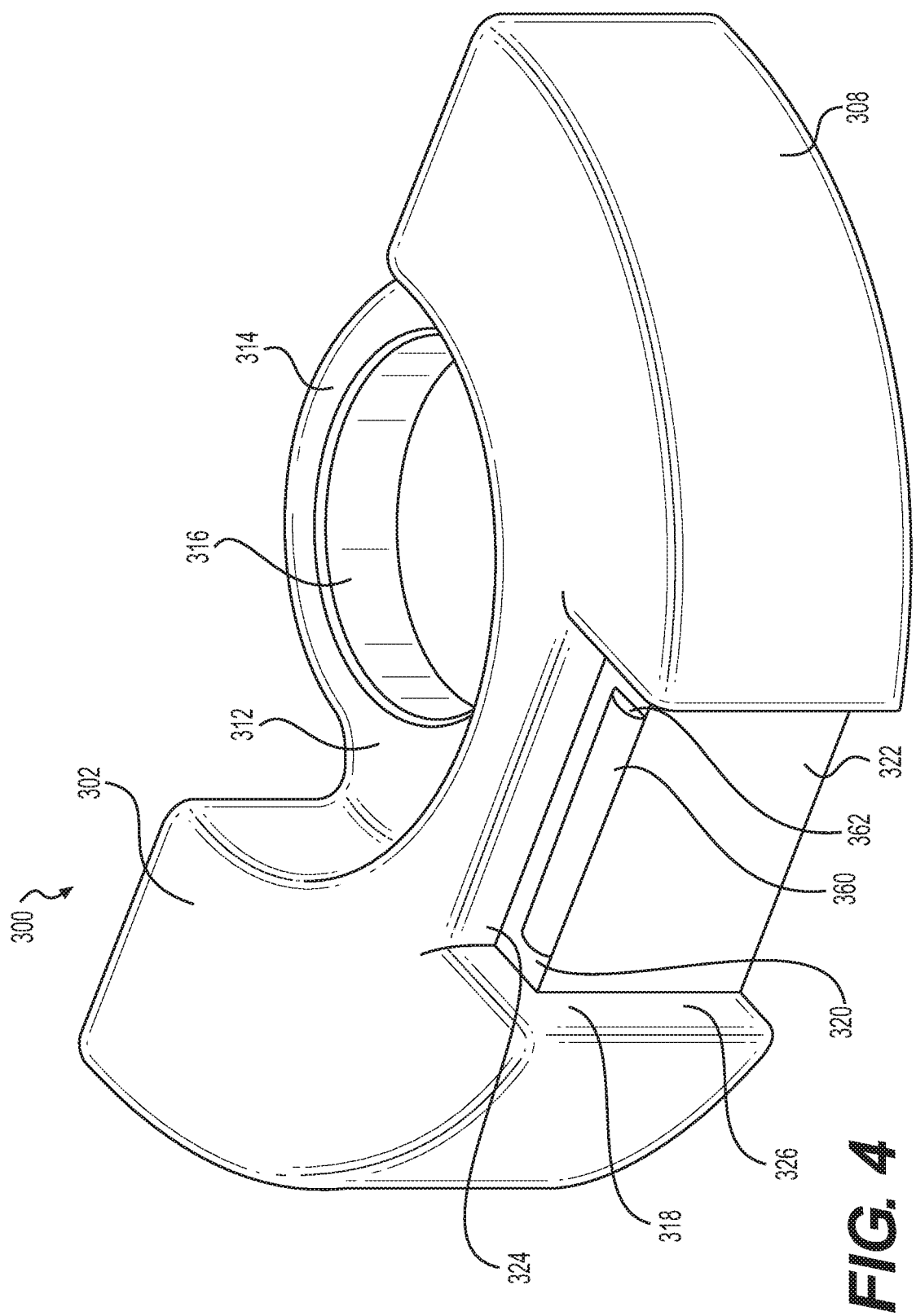
FIG. 4 illustrates an example of a perspective view of a compliant counterweight according to some implementations.

FIGS. 3 and 4 illustrate examples of perspectives views of a compliant counterweight according to some implementations. As shown in FIG. 3, in some instances, a slider block 122 may be press fit into a bore for the slider block 316 of the compliant counterweight 300. Accordingly, the compliant counterweight 300 may be attached or affixed to the slider block 122 and may essentially offset the mass of the orbiting scroll 14 during operation.

A main body of the compliant counterweight 300 may essentially have a C shape having an outer diameter surface 308 and a first end face 304 and a second end face 306 that may be 180° from each other. Each end face 304, 306 may essentially be a flat and planar outer surface and a plane of each end face 304, 306 may be parallel to the main axis 21 and, in some examples, each of the end faces 304, 306 may be parallel to one plane. Further, in some implementations the first end face 304 and the second end face 306 may less than or greater than 180° from each other with respect to the circular shape of the counterweight. In other words, in some implementations, the plane parallel to a first end face 304 may not be parallel to the second end face 306.

In some examples, an inner curved surface 310 of the C-shaped compliant counterweight 300 may be essentially circular (or half-circular) or may be curved and may have a smooth surface. The curvature of the inner curved surface 310 may correspond with a curvature of the outer diameter surface 308. Further, the inner curved surface 310 may be smooth and/or flat. The bore for the slider block 316 may not be coaxial or concentric with the curved portion of the inner surface 310 of the counterweight and may be offset. The bore for the slider block 316 may be disposed in a lower flat portion of the counterweight 312, a plane of which may be disposed perpendicular with respect to the inner curved surface 310. In other words, in some implementations, the lower flat portion 312 may be flat and may be perpendicular to the main axis 21. Further, a plane including the lower flat portion of the counterweight 312 may be perpendicular to a plane including the end faces 304, 306.

In some implementations, a first radial distance from an edge of the bore for the slider block 316 to an edge of the first end face 304 may be less than a second radial distance from an edge of the bore for the slider block 316 to a portion of the inner curved surface 310, such as a portion of the inner curved surface 310 closest to the cut out or notched portion 318. Accordingly, the lower flat portion 312 may not be circular and may have a curved or rounded shape that does not have the same or constant radius.

Additionally, the lower flat portion 312 may have an outer rim portion 314 extending in the radial direction beyond the end faces 304, 306. This outer rim portion 314 may have an arc shape consistent with the bore for the slider block 316.

In some examples, the upper surface of the lower flat portion 312 may be parallel to an upper surface 302 of the compliant counterweight 300. Further, an outer diameter surface 308 of the main body of the compliant counterweight 300 may be essentially perpendicular to the upper surface 302. A cut out or stepped portion 318 may be disposed in the upper surface 302 and the outer diameter surface 308. An upward facing surface 320 may be parallel with the upper surface 302, but lower or set in, in the axial direction. The upward facing surface 320 may essentially be flat or include a rounded protrusion or bump 360 protruding from the upward facing surface 320. The protrusion or bump 360 will be explained in more detail below. Further, the cut out portion 318 may have a shape corresponding with an arm 512 of the counterweight guide plate 500, which will be discussed in more detail below. Further, a mass, shape, and position of a center of gravity of the compliant counterweight 300 may be modified based on the positional relationship of other components of the compressor. Additionally, the edges of the respective surfaces of the compliant counterweight 300 may be smooth, rounded, or squared.

As shown in FIG. 4, the cut out portion 318 may be disposed in the outer diameter surface 308 and the upper surface 302 at a position opposite and in alignment with the bore for the slider block 316. In some examples, the cutout portion 318 is equidistant along a circumferential direction of the outer diameter 308 from each of the end faces 304, 306. Within the cut out portion 318, stepped surfaces including an upward facing surface 320 and an outward facing surface 322 may be disposed. These surfaces 320, 322 may be flat and/or smooth and may be perpendicular with respect to one another. Further, the upward facing surface 320 may be parallel with the upper surface 302 and perpendicular to the main axis and/or slider block 122. As mentioned above, the upward facing surface may include a rounded bump or protrusion 360. In some implementations, the protrusion 360 may be square or flat, or triangular such that one surface of the triangular bump or protrusion 360 is parallel and contiguous with respect to the outward facing surface 322. In an implementation where the protrusion or bump 360 is rounded, the shape may be semi-circular. Further, in some examples, the protrusion or bump 360 may not span an entire width of the cut out portion 318. A pair of inward facing cutout surfaces 326 face each other and may be perpendicular to an outward facing cutout surface 324. In some implementations, the upward facing surface 320 is perpendicular to the outward facing cutout surface 324. Further, as shown, sidewalls 362 of the bump or protrusion 360 may be parallel to the inward facing cutout surfaces 326.

Figure 5:
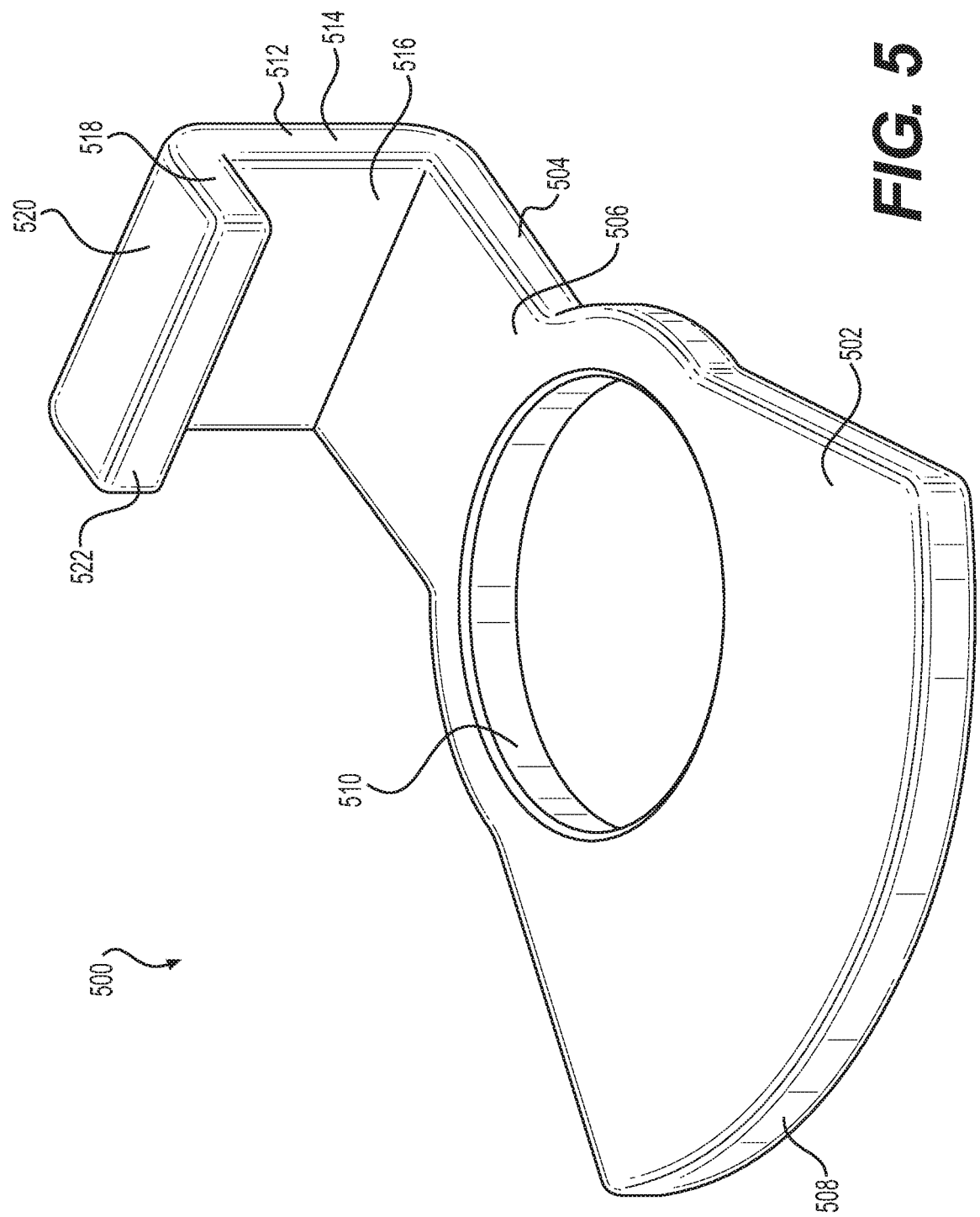
FIG. 5 illustrates an example of a perspective view of a counterweight guide plate according to some implementations.

FIG. 5 illustrates an example of a perspective view of a counterweight guide plate according to some implementations. As shown in FIG. 5, the counterweight guide plate 500 includes a base portion 506 and an arm portion 512. The base portion includes a top or upper surface 502 that may be perpendicular to the main axis and a side surface 504. The upper surface 502 may essentially be flat and a bore for the main shaft 510 is disposed in the base portion 506. As shown in FIG. 5, the base portion 506 may include a curved outer edge 508 that may fan radially outward from the bore for the main shaft 510. The bore 510 for the main shaft 20 may engage with and be disposed on to the stepped diameter portion 120 of the main shaft 20, as shown in at least FIGS. 1 and 2. In some instances, a lower portion of the bore 510 may engage and contact with a flat surface of the stepped diameter portion 120 that is perpendicular to the main axis 21. In some examples, the counterweight guide plate 500 may be press fit onto the upper portion of the main shaft 20 (below the shaft eccentric 22) or on the stepped diameter portion 120. Further, upon assembly of the counterweight guide plate 500 onto the main shaft 20, a portion of a top surface of the main shaft 20 (below the main portion of the shaft eccentric 22) may be flush with a top or upper surface of the base portion 506 of the counterweight guide plate 500. Further, in some implementations, the lower surface of the compliant counterweight 300 is in contact with the top or upper surface of the base portion 506 of the counterweight guide plate 500. Accordingly, in some implementations, a distance in the axial direction of the stepped diameter portion 120 of the main shaft 20 may be equal to a thickness, in the axial direction, of the edge 504 of the base portion 506 of the counterweight guide plate 500.

The arm portion 512 may be "L" shaped extending off the base portion 506. The arm portion 512 may stabilize the slider block 122 and compliant counterweight 300 during operation. This aspect will be discussed in more detail below. In some implementations, the arm portion 512 may include a vertical portion 514 extending upward from and perpendicular to the base portion 506 and parallel to the main axis 21. The vertically extending portion 514 may be a wall or protrusion that having an inside facing surface 516 facing the compliant counterweight 300. Further, the vertically extending portion 514 may have a thickness in a radial direction equal to a thickness of an edge 504. The inside facing surface 516 may have a shape corresponding to the shape of the outward facing surface 322 of the compliant counterweight 300. Further, a gap or clearance may exist between the outward facing surface 322 and the inside facing surface 516.

Extending inwardly from the vertically extending portion 514 and toward the main shaft 20 in the radial direction and perpendicular to the vertically extending portion 514, in some implementations, is a lip or protrusion portion 518. The protrusion 518 may have an inward facing surface 522 that faces toward the main shaft 20 and faces an outward facing cutout surface 324 of the notched or cutout portion 318 of the compliant counterweight 300. In some implementations, a gap or clearance may exist between the outward facing cutout surface 324 and the inward facing surface 522. The inward protrusion 518 may also include a top surface 520, which is parallel with the base portion 504.

Figure 6:
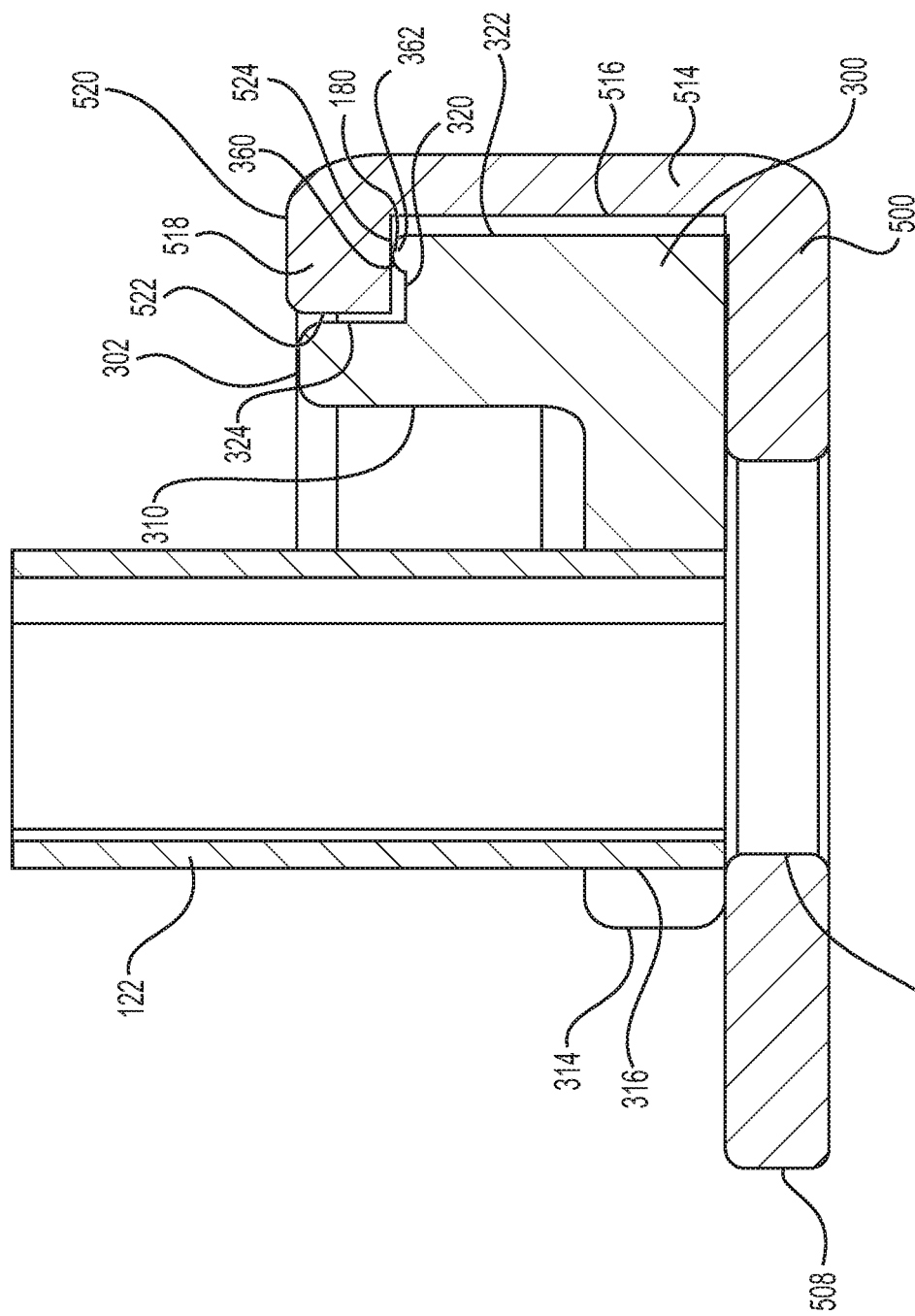
FIG. 6 illustrates an example of a portion of a cross-sectional view of a scroll compressor according to some implementations.

FIG. 6 illustrates an example of a portion of a cross-sectional view of a scroll compressor according to some implementations. As shown in FIG. 6, opposite to the top surface 520 is a lower surface 524 of the protrusion 518. The lower surface 524 may be flat and smooth and may be perpendicular to the main axis 21. One purpose of lower surface 524 and the bump or protrusion 360 is to prevent the compliant counterweight 300 and slider block 122 assembly from an adverse compliant counterweight rotation, due to high speed centrifugal force of the orbiting.

Additionally, in some implementations, a width of the notched or cut out portion 318 may correspond to a width of the arm 512 with additional sliding clearance. Accordingly, in some implementations, respective side surfaces of the arm 512 may correspond with respective side surfaces of the notch or cut out portion 318, such as inward facing cut out surfaces 326. Theses surfaces may make sliding contact, but with adequate clearance to not impede the sliding of the compliant counterweight 300 and slider block 122 assembly. These surfaces are intended to capture the compliant counterweight 300 in a radial alignment to prevent excessive movement. In some implementations, there is no radial movement between the compliant counterweight 300 and guide plate 500.

Additionally, in some implementations, a gap or clearance 180 exists between the bump or protrusion 360 and the lower surface 524 in the axial direction. The inward extending radial protrusion 518, and more specifically the lower surface 524, may provide an "up stop" for the compliant counterweight 300 sub-assembly with slider block 122, and may limit the tilting and edge loading of the slider block 122 with respect to the orbiting scroll bearing 142. The centrifugal force of the orbiting mass could cause problems, such as instability, as well as transient conditions of the scroll operation. This reliability feature is especially important at the highest operating speed. The stabilizing surfaces (e.g., 360, 524) stabilizes the slider block 122 and one purpose is to maintain strict vertical orientation of the slider block 122 with respect to the main shaft axis. This strict orientation prevents cross loading in the orbiting scroll bearing at high speeds due to reacted moment on the counterweight slider block assembly. Further, by applying the balanced counterweight to the slider block, and counterweight guide plate attached to the drive shaft 20 as disclosed herein the compressor can achieve essentially constant involute flank contact from low to high speeds, for example.

As mentioned above, the slider block 122 is disposed in the bore 316 of the compliant counterweight 300. In some implementations, with respect to alignment, the slider block axis and stabilizing surfaces, which may include the bump or protrusion 360 and lower surface 524 of the protrusion 518, must be perpendicular. Further, the axial centerline of the slider block 122 may be perpendicular to the radial axis of the compliant counterweight 300. The bump or protrusion 360 and lower surface 524 of the protrusion 518 may be below the top surface 302 of the compliant counterweight 300 in the axial direction. Further, the top surface 520 of the protrusion 518 may be higher than the top surface 302 in the axial direction. Since, for example, the slider block 122 is attached to the compliant counterweight 300, the stabilization caused by the interface, contact, or abutment of the bump or protrusion 360 and the lower surface 524 of the inward protrusion 518 prevents harmful tilting of the slider block 122 inside the orbiting scroll bearing 142, which may occur at high speeds due to excessive centrifugal force. Additionally, a top surface of the bump or protrusion 360 may provide a line of contact or surface of contact at high speeds. In some implementation, the line of contact of the bump or protrusion 360 may be as far radially outward and away from the slider block 122 as possible to provide the best stabilization.

Further, the respective interfaces or corners of the respective surfaces of the counterweight and the counterweight guide plate may be rounded, smooth, or may be squared. For example, Further, the corner or interface of the vertical portion and the lower portion of the counterweight may be a rounded edge or squared edge. Likewise, the corner or interface of the top portion and the vertical portion may be rounded or squared.

Further, as shown in FIG. 6, an outer edge 508 of the base portion 506 may extend in the radial direction further than the outer rim portion 314. As mentioned above, the outer edge 508 may extend radially outward and may function to align a center of mass of the guide plate 500 to the center axis of the main shaft 20 and this may balance the guide plate 500 for shaft high speed operation. In some instances, the profile or edge of the outer edge 508 of the counterweight guide plate 500 may be curved, circular, or flat.

Figure 7:
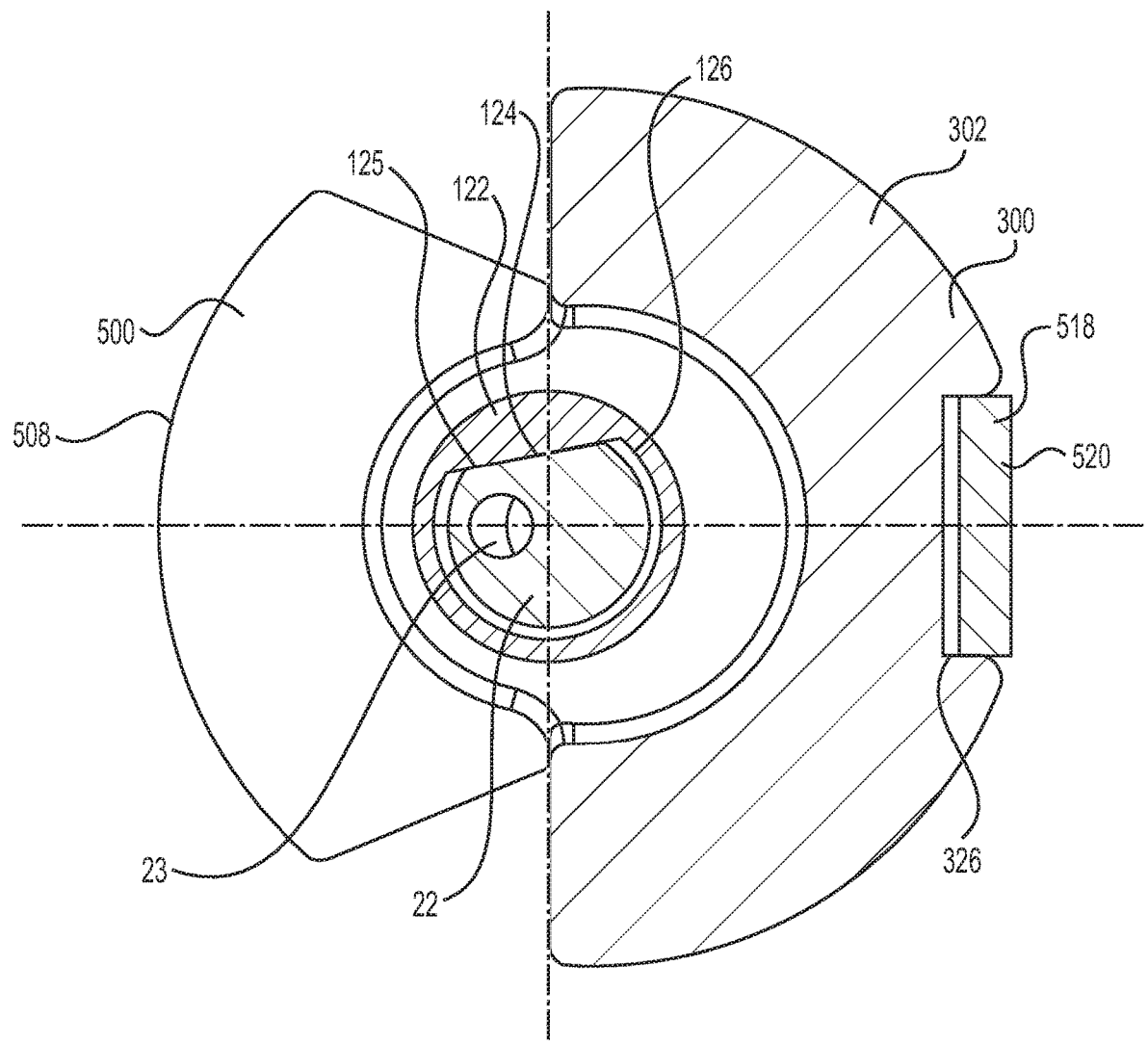
FIG. 7 illustrates an example of a top view of a portion of a scroll compressor according to some implementations.

FIG. 7 illustrates an example of a top view of a portion of a scroll compressor according to some implementations. As shown in FIG. 7, the slider block 122 may essentially have a circular profile and may be essentially cylindrical and hollow. An inside surface or inner surface 126 of slider block 122 may have an essentially flat surface or flat portion 124. The flat potion 124 may correspond to a flat portion 125 of the shaft eccentric drive pin 22 (which may also may be known as an eccentric drive flat 125), which may have a specific orientation to the shaft eccentric 22 radial axis. Further, the relationship of the drive flat 125 to the eccentric offset is a drive angle, will be discussed in more detail below. The curvature of the inside of surface 126 of the slider block 122 may correspond with a curvature of an outer surface of the shaft eccentric 22. An axial centerline axis of the slider block 50 may be perpendicular to a radial axis of the compliant counterweight 300. The slider block 122 may also be disposed to be aligned in an axial direction related to the lower end of the block.

FIG. 7 further shows an oil hole 23, which may be disposed in a top surface of the shaft eccentric 22 for dispelling oil that is pumped upwards during operation. A gap or clearance may exist between outer surface portions of the shaft eccentric 22 and inner surface portions 126 of the slider block 122. Further, in some implementations a vertical plane including the first end face 304 and the second end face 306 of the compliant counterweight 300 may be parallel with a diameter of the slider block as shown by a dotted line in FIG. 7. As further shown, the portion of the counterweight guide plate 508 may essentially have a curved, circular, sector portion that fans outward in the radial direction. FIG. 5 further shows that the top surface 302 of the compliant counterweight 300 may have a semi-circular profile.

Figure 8:
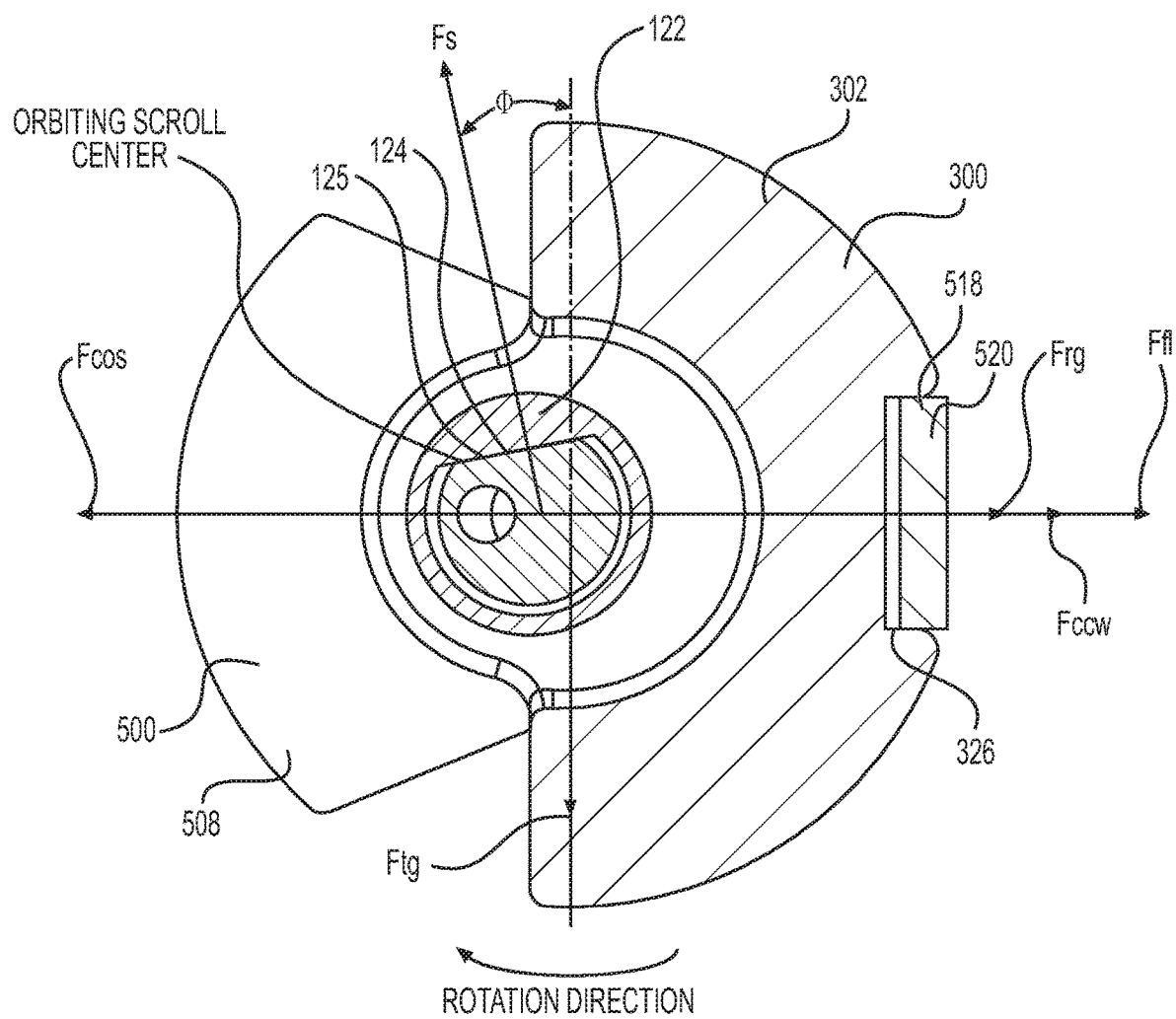
FIG. 8 illustrates an example of various forces during operation according to some implementations.

FIG. 8 illustrates an example of various forces during operation according to some implementations. FIG. 8 shows various radial forces overlaid on the elements of FIG. 5. FIG. 6 shows, for example, that the slider block 122 may be disposed within the bore 316 with a particular radial alignment with respect to the slider block drive flat 124 on the inner surface of the slider block 126. This orientation is based on the angle $\Phi$. When this angle is positive, it adds a component of the very large and difficult Ftg Tangential Gas Force, which is essentially compression. The addition of this component is applied to the centrifugal force of the orbiting scroll 14 (and opposite the radial gas force). For example, Ftg is a tangential gas force, which may be a dominant gas pressure force in a horizontal direction; Frg is a radial gas pressure force, which is a minor gas pressure force in the horizontal direction that may act to open flank contacts; F cos is a centrifugal force of the orbiting scroll that is based on mass and speed and works opposite the radial gas force Frg; Fccw is a centrifugal force of the compliant counterweight that works opposite the centrifugal force of the orbiting scroll F cos; Fs is a driving force of the slider block from the motor to the compression mechanism; Ffl is a flank contact force between the wall of the involutes; Φ represents a drive angle, which adds a component of Ttg to the centrifugal force of the orbiting scroll F cos.

The tangential gas force Ftg may be very large and may be located between a center of the orbiting scroll 14 and the fixed scroll 10, and may essentially be 90° from the flank contact points. This tangential gas force Ftg may affect the orbiting scroll 14, with a cyclic load variation, depending on the actual involute design of the fixed and orbiting scroll set. The radial gas force Frg may be comparatively small, essentially 90 degrees from the tangential, and works to open the flank contact points. These two forces may vary greatly with the operating condition of the compressor, but little with the speed of the compressor. The centrifugal force of the orbiting scroll F cos is dependent on the mass, the orbit radius, and the speed of the motor (stator 26, rotor 28). The centrifugal force of the compliant counterweight Fccw is designed to be essentially the same as the orbiting scroll centrifugal force, but operates 180° apart. The function of this part is to essentially offset the centrifugal force of the orbiting scroll F cos. The slider block force Fs is the transfer of motion and power to the compression mechanism, and varies with the operating condition as well as the speed of the motor. The flank force Ffl is the direct contact between the walls of the orbiting scroll and the fixed scroll.

Figure 9:
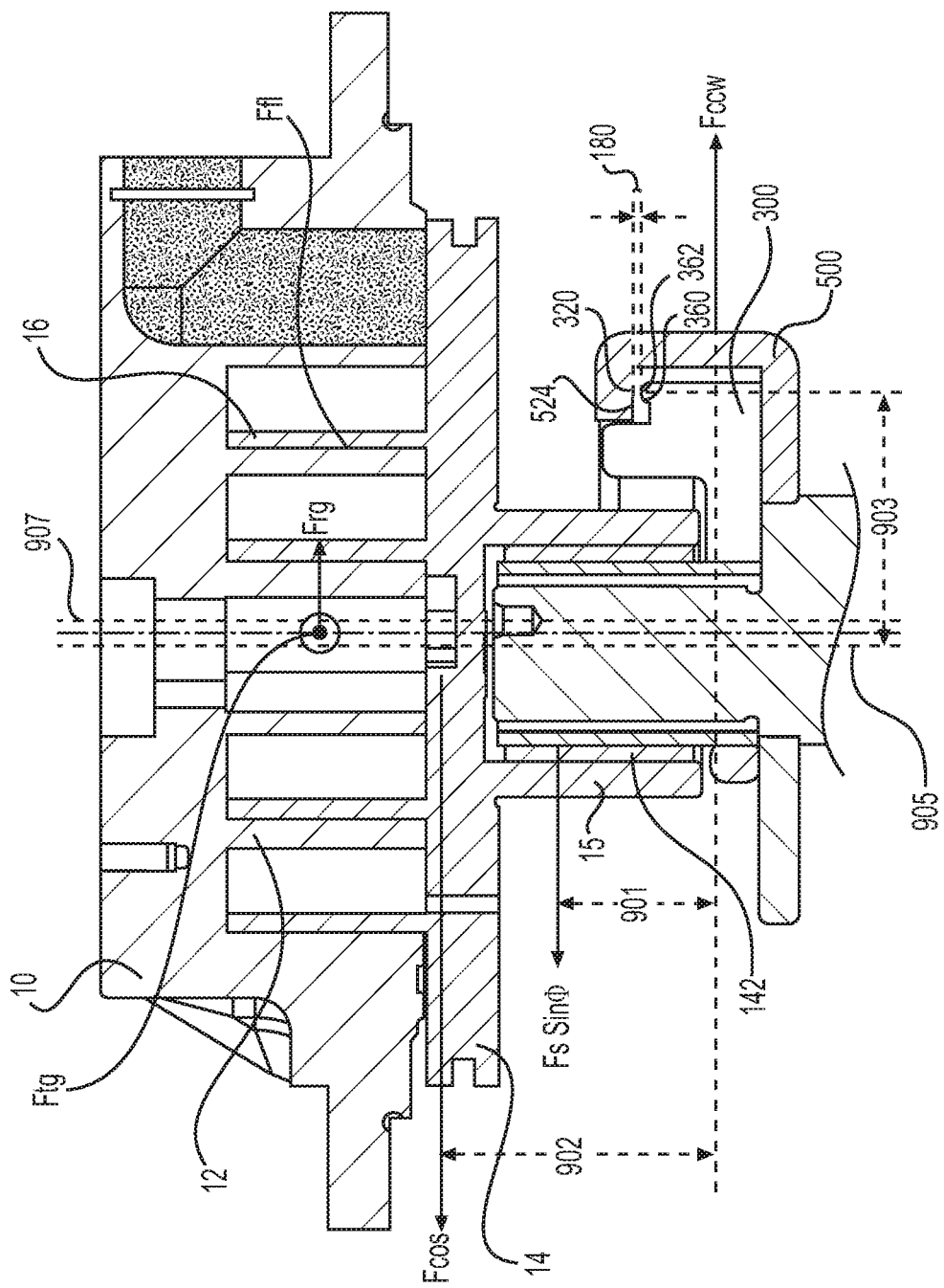
FIG. 9 illustrates an example of various forces and moments during operation according to some implementations.

FIG. 9 illustrates an example of various forces and moments during operation according to some implementations. Reference number 905 represents the centerline of the orbiting scroll bearing 142. Fccw is on the center of mass of the compliant counterweight 300, with a moment arm 902 from F cos, on the center of mass of the orbiting scroll 14. A dashed line 907 may indicate a center of the fixed scroll 10, center of the shaft 20 and center of the shell 6. Fs Sin Φ is the component of compression force from the shaft, based on the drive angle Φ, with a moment arm 901 from the Fccw force. The line of contact of a top surface of the bump or protrusion 360 and the lower surface 524 in addition to the center line of the orbiting scroll 905 defines the moment arm 903. These parameters may be optimized to produce the desired performance and reliability of the elements of the dynamic radial compliance. In some implementations, flank contact force may be defined by the following equation:

$$Ffl = F\cos - Fccw - Frg + Fs*\sin \Phi \qquad \text{EQ1}$$

Accordingly, by specifying the respective parameters of equation EQ1, an adequate and essentially constant flank force contact may be maintained at all operation conditions and speed of the motor. The orbiting scroll centrifugal force is F cos and this is essentially cancelled by compliant counterweight Fccw. At low speed, the operating condition is normally also low. Therefore, the main compression gas force Fs is also lower, as is the radial gas force Frg. Therefore the drive angle Φ can be maximized to increase a component of the large compression force FS, and this essentially offsets the small radial gas force Frg enough to produce the optimum flank force Ffl.

The techniques described herein can maintain absolute flank contact down to this speed, without excessive oil injection to minimize the leakage. Conversely in the fixed eccentric scroll mechanism, the orbiting scroll centrifugal force at very high speed produces excessive noise and this is the primary limitation of the design. In this case the techniques described herein avoid the orbiting scroll centrifugal force and the flank load is essentially the defined by the drive angle, which can be optimized for the entire operating range.

At high speed, the operating condition is normally much higher. This can be both in high load (cooling) as well as a high pressure ratio (heating). Therefore, the main compression gas force Fs is also higher, as is the radial gas force Frg. Therefore the drive angle Φ can be minimized to reduce a component of the large compression force FS, and this essential offsets the small radial gas force Frg just enough to produce the flank force Ffl.

Figure 10:
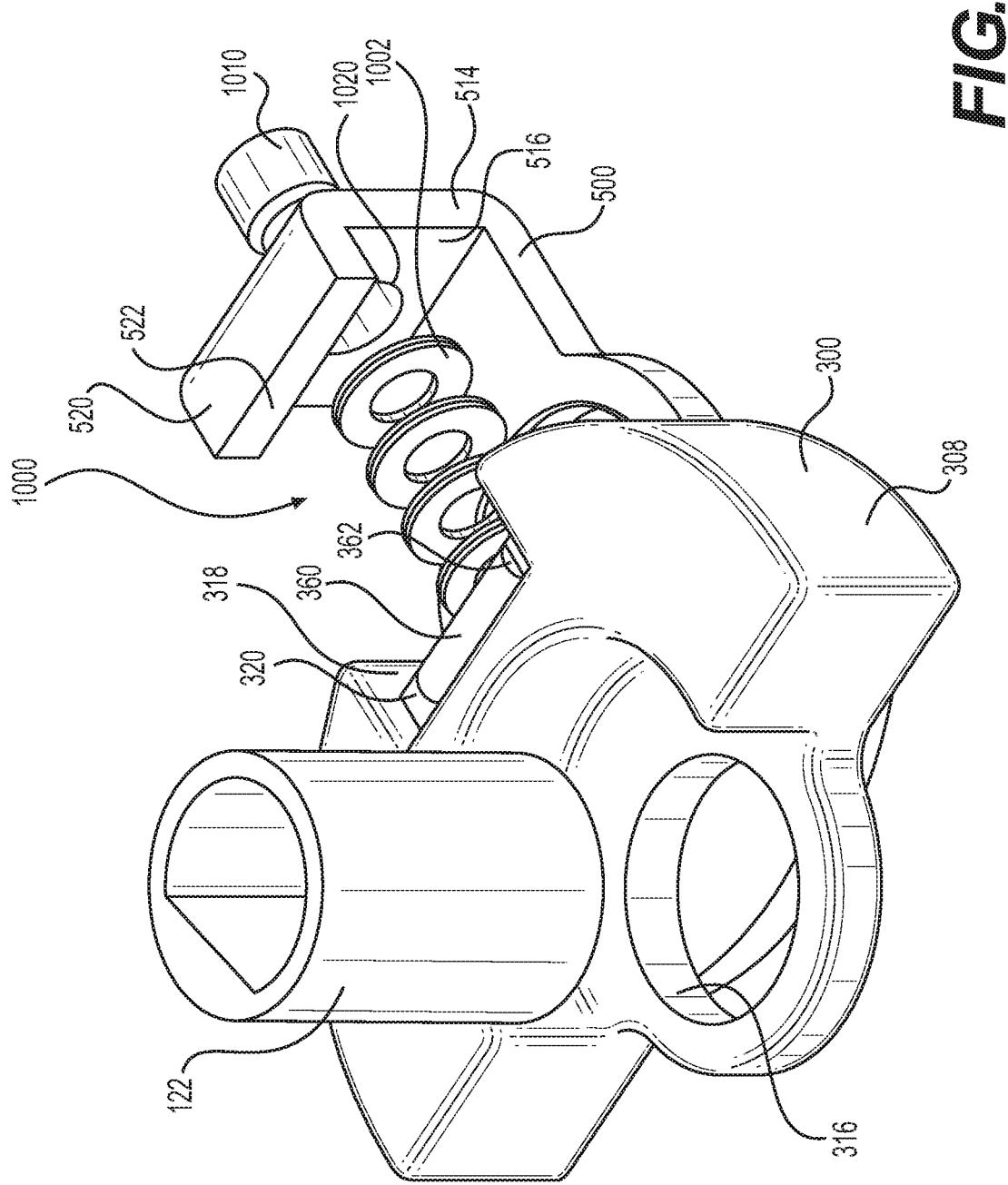
FIG. 10 illustrates an example of an exploded perspective view of a portion of a scroll compressor according to some implementations.

FIG. 10 illustrates an example of an exploded perspective view of a portion of a scroll compressor according to some implementations. Some elements shown in FIG. 10 may be the same or similar as those shown in previous Figures and therefore the description and interconnectivity of those elements may not be repeated herein. Further, the elements shown in FIG. 10 may be a variation of the aforementioned elements. FIG. 10 shows that in some implementations, a spring assembly 1002 may be provided that may add a spring force between the counterweight guide plate 500 and the compliant counterweight 300. The spring assembly 1002 force can essentially obtain a benefit from both the drive angle being maximized and minimized, as discussed above. A spring assembly force Fspr may be described as a force exerted on the compliant counterweight 300. In some instances, the spring assembly may include a spring, coil, or other elastic mechanism that may exert a force between the counterweight guide plate 500 and the compliant counterweight 300. Additionally, in some instances, the spring assembly 1002 may be a set of disk-type Bellville washers or disc springs, with a total deflection of about 0.010 inch at about 65 pound force. The dynamic radial compliance sub-assembly may produce no force, until the adjustment member is activated. When the dynamic radial compliance mechanism is fully assembled, a precise spring force can be activated during compressor assembly. FIG. 10 further shows the bump or protrusion 360 protruding from the upward facing surface 320.

Figure 11:
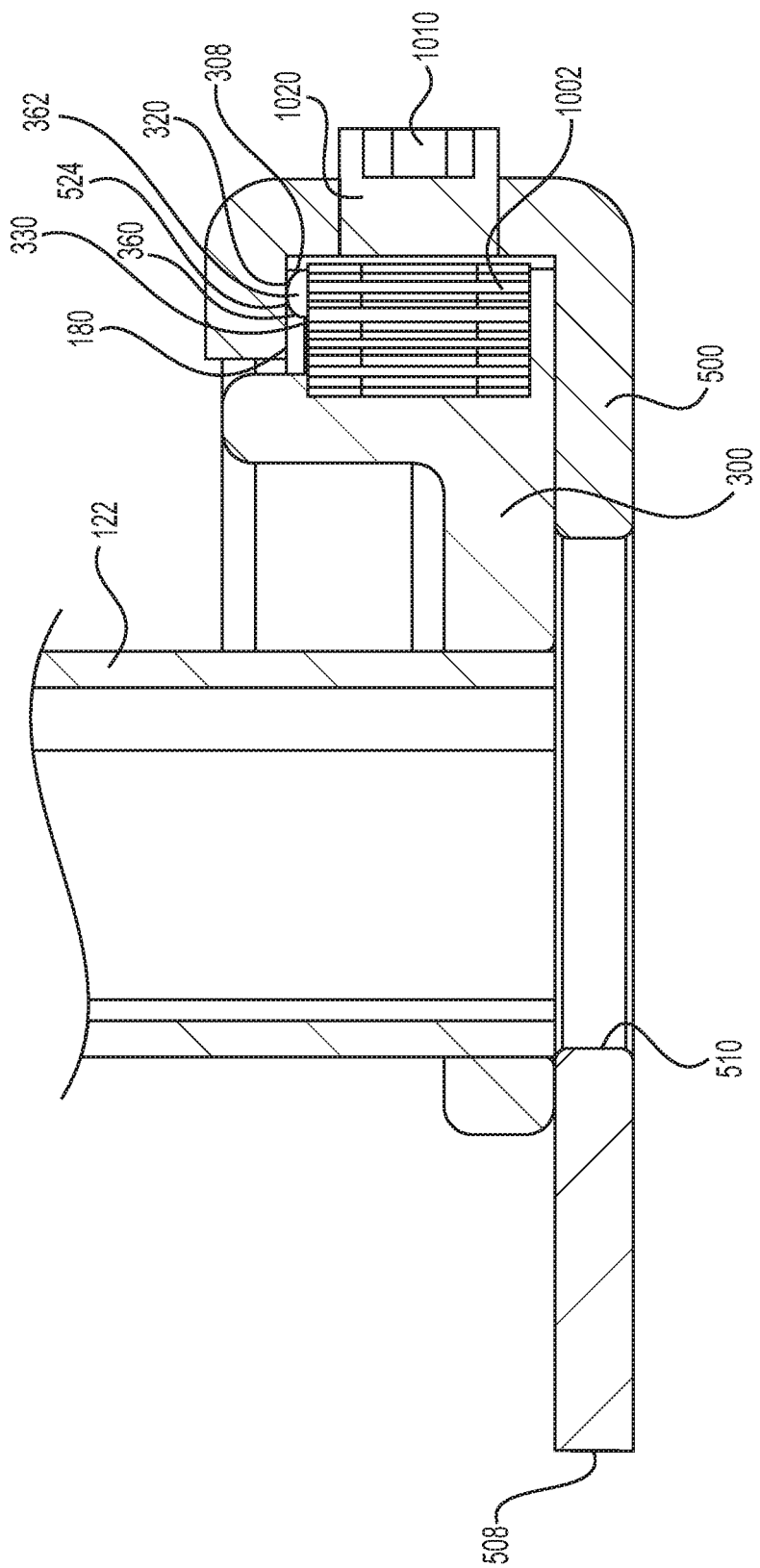
FIG. 11 illustrates an example of a cross-sectional view of a portion of a scroll compressor according to some implementations.

FIG. 11 illustrates an example of a cross-sectional view of a portion of a scroll compressor according to some implementations. A recess 330 may be machined radially inward in the compliant counterweight 300 and essentially below the notched or cutout portion 318, to accept the spring assembly 1002. The recess 330 may be round and may be machined radially inward essentially perpendicular to the main shaft 20. An aligned threaded hole 1020 may be disposed in the counterweight guide plate 500 and may be in the vertical portion 514 of the arm 512. A set screw 1010 or similar component could then be inserted into the recess 1020. The set screw 1010 may be a spring adjustment member, located in the horizontal plane, to compress a spring assembly 1002 which provides a radial force against the compliant counterweight 300. In some examples, the spring assembly 1002 may contact inside surfaces of the counterweight guide plate 500 on one side in the radial direction and may contact an outer surface of the recess of the compliant counterweight 300 on another side of the spring assembly in the radial direction. FIG. 11 further shows the bump or protrusion 360.

In some implementations, in addition to the spring force provided by the spring assembly 1002, the compliant counterweight 300 could be designed to be mathematically over-balanced by a certain amount. The overbalanced quantity may then be counteracted by the guide plate contact, to achieve fully balanced compressor operation, without additional flank force. According to this implementation, the flank contact could be optimized for the lower speeds, since system performance ratings are very sensitive to this condition. For higher speeds above a selected range, the involute flanks would lose contact by a small amount. The parameters for optimizing this speed range for the switchover from flank contact to open contact, would be the over-balance amount of the compliant counterweight 300, the drive angle Φ, and the adjustment described above. Example values could include 110% compliant counterweight overbalance and an 11 degree drive angle Φ for a switchover speed in a range of 5400-6000 RPM. For example, as mentioned above, the compliant counterweight 300 mass may essentially be equal to the orbiting scroll 14 mass; therefore there may be a cancellation of the two force vectors, except for moments. The compliant counter weight additional mass may create the over balance. Further, applying this spring force could actually enable a design which could produce a small separation of the involute flank contact at very high speed; thus greatly reducing the sound level.

Figure 12:
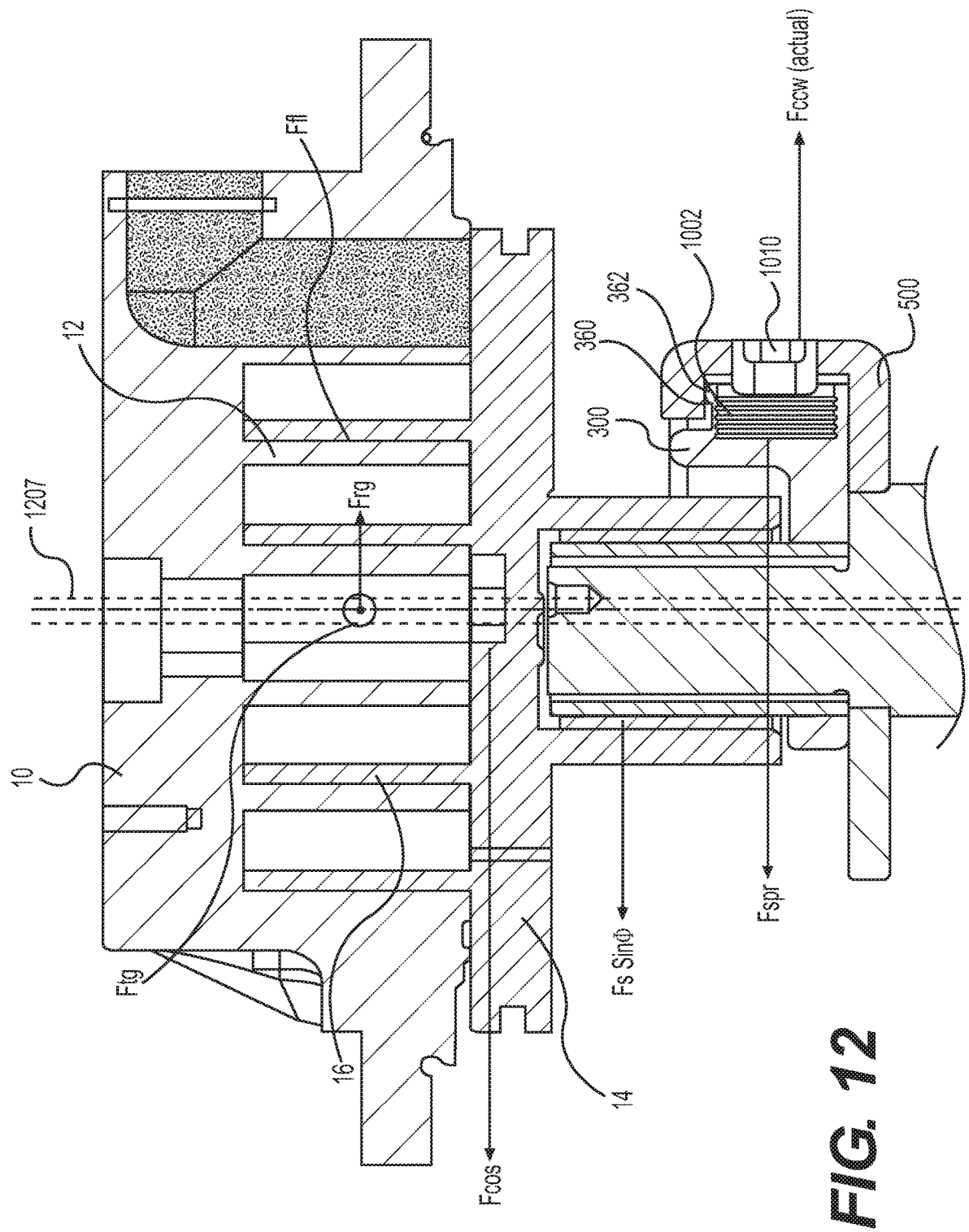
FIG. 12 illustrates an example of various forces during operation according to some implementations.

FIG. 12 illustrates an example of various forces during operation according to some implementations. Reference number 1205 represents the centerline of the orbiting scroll 14 and reference number 1207 represents the center of fixed scroll 10, center shell 6, and shaft 20. FIG. 12 illustrates that the variable Φ could be optimized along with the spring force Fspr, and the value of this approach could be to further minimize the variation in Ffl between the various operating conditions of the compressor. Further, EQ1 may include a spring force Fspr, such that EQ2 sets forth:

$$Ffl_i = F\cos - Fccw - Frg + Fs^*\sin \Phi + Fspr \qquad \text{EQ2}$$

FIG. 12 shows the spring assembly 1002 and set screw 1010 assembled with the compliant counterweight 300 and the counterweight guide plate 500. The variable D could be optimized along with the spring force Fspr. While one overall objective of some of the implementations described herein are to minimize the large variation in involute flank force Ffl, there is a potential issue with starting compression at lower speed. For an optimized value of the drive angle Φ, for the lowest sound at high speed, at adequate low speed starting, the developed compression force could offset the centrifugal and drive angle force. If this occurs, the involute flanks may not make contact and this essentially prevents the rise of the compression force, and the compressor could simply run without actually generating a differential pressure. While a larger drive angle may solve this problem, the increase would then cause excessive flank contact force at high speeds. The negative result would be higher sound level. Applying this optimized spring force may produce a small separation of the involute flank contact at very high speed; thus greatly reducing the sound level. The inherent oil injection in a high side variable speed scroll, would affectively seal the intentional flank clearance; and performance could remain acceptable. In a high side scroll, the oil injection generally becomes excessive at very high speeds, and consumes higher power. Therefore, the combined technologies previously described herein could produce a desirable effect throughout the entire speed range.

Assembly of the compressor may include one or more of the following steps. The following does not necessarily indicate an order of the steps. The motor stator 26 may be assembled into the center shell 6. The rotor 28 may be assembled to the proper position on the shaft 20 and the main frame may be inserted onto the main bearing 24 location of the drive shaft 20 utilizing a spacer above the rotor 28. The slider block 122 may be press fit into the precision bore 316 of the compliant counterweight 300. In some implementations, a spring assembly 1002 may be inserted into the recess 330 of the compliant counterweight 300. The counterweight guide plate 500 and compliant counterweight 300 sub-assembly may be assembled. At this point, according to some implementations, the spring adjustment is not yet activated. Assembly steps may further include supporting a lower end of the drive shaft 20 and press fitting the above-mentioned sub-assembly onto the shaft at the step diameter 120 described above. In some implementations, the spring adjustment may then be set to the required force through a window in the main frame of the compressor. Then the completed sub-assembly could be rotated upside down, and the non-metallic spacer could be removed. With special tooling to isolate the rotor, a next step could include press fitting the upside down center shell 6 onto the main frame sub-assembly.

Figure 13:
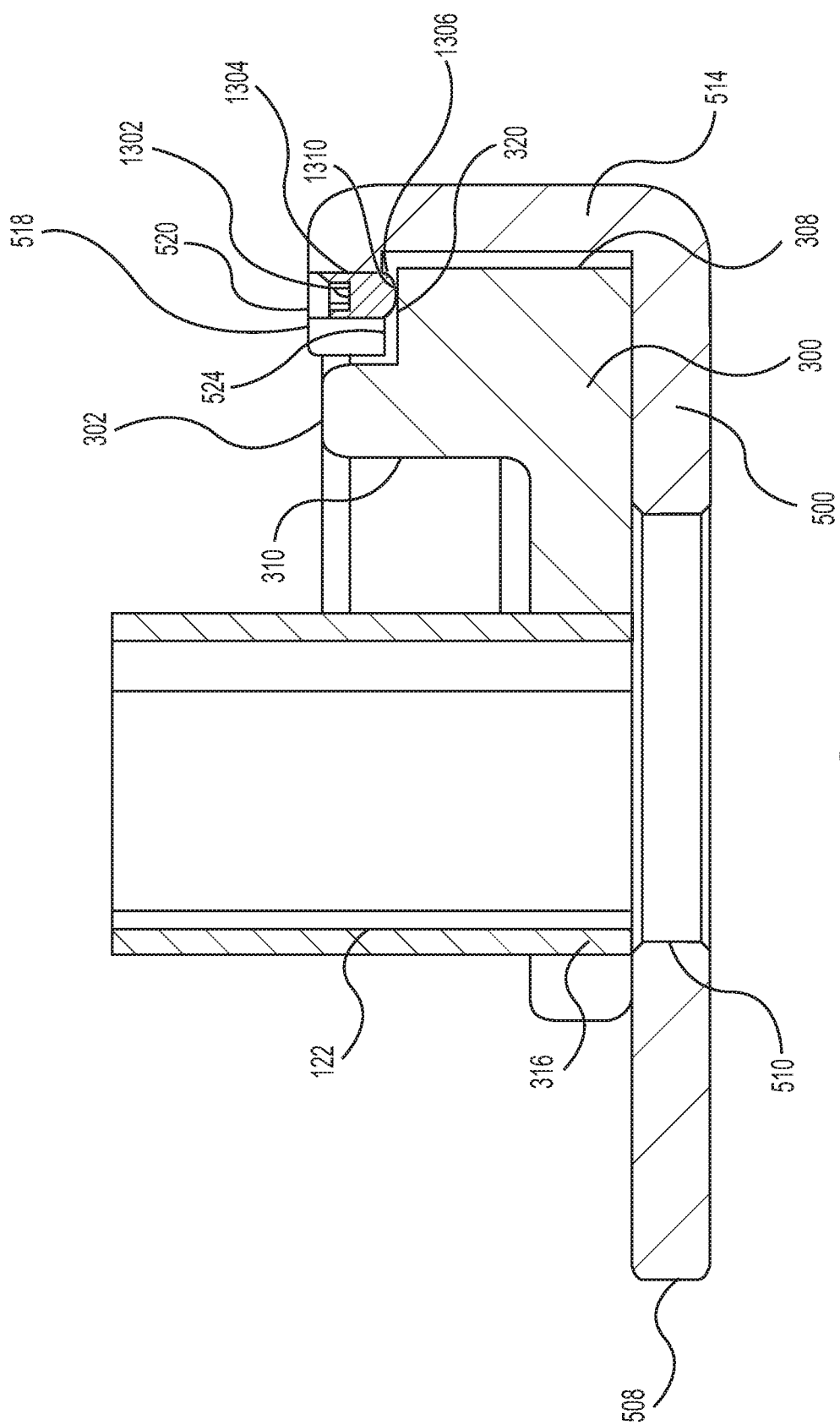
FIG. 13 illustrates an example of a portion of a cross-sectional view of a scroll compressor according to some implementations.

FIG. 13 illustrates an example of a portion of a cross-sectional view of a scroll compressor according to some implementations. Some elements shown in FIG. 13 may be the same or similar as those shown in previous Figures and therefore the description and interconnectivity of those elements may not be repeated herein. The elements shown in FIG. 13 may be a variation of the aforementioned elements. For example, FIG. 13 shows a compliant counterweight 300 attached to a slider block 122 within the bore for the slider block 316. Further, FIG. 13 shows a counterweight guide plate 500. In the implementation shown in FIG. 13 an adjustment screw 1302 is disposed in an inward protruding portion 518 of the stabilization arm 512. For example, a threaded hole 1304 may be formed into the protruding portion 518 from the top surface 520. The screw 1302 may be disposed within the inward protruding portion 518 and a lower surface of the screw 1306 may extend beyond the lower surface 524 of the protruding portion 518 in the axial direction. Further a clearance or gap 1310 may exist between the lower surface of the screw 1306 and the upward facing surface 320.

The screw 1302 assembly as described above may be adjustable and a distal end of the screw 1302 may be rounded. Adjusting the screw determines a position, in the axial direction, in which a distal end of the screw may be above the upward facing surface 320. In some implementations, a gap or clearance may exist between the distal end of the screw and the upward facing surface 320. At high speeds, the distal end of the screw may abut or contact the upward facing surface 320 thereby stabilizing the slider block 122. Further, the contact or abutment of the distal end of the screw 1302 with the upward facing surface 320 may prevent edge loading failure of the orbiting scroll bearing 142, for example. The set screw 1302 may provide for a precise clearance setting. In sub-assembly, the setting of this set screw 1302 could be made by placing a precision shim between the compliant counterweight 300 surface and the guide plate 500 surface. The screw 1302 could then be torqued downward until contact is made with the shim material, and a torque setting could be established. After this setting procedure is complete, a drop of liquid adhesive material could be placed on top of the screw and it will permanently hold the setting. Such a material exists for use in hermetic refrigerant compressors.

With respect assembly, one or more of the following steps in addition to other steps may be implemented. The motor stator 26 may be assembled into the center shell 6. The rotor 28 may be aligned to the proper position on the shaft 20. The main frame 18 may be inserted onto the main bearing location of the drive shaft 20 by utilizing a spacer above the rotor 28, in some implementations. The slider block 122 may be press fit into the precision bore 316 of the compliant counterweight 300. Then, the counterweight guide plate 500 and compliant counterweight sub-assembly may be assembled in a fixture such that the stabilizing surface set screw can be adjusted and secured. Then, a step of supporting the lower end of the drive shaft, and press fitting the above sub-assembly onto the shaft 20 at the step diameter may be completed. The completed sub-assembly may be rotated upside down, and the spacer may be removed.

Figure 14:
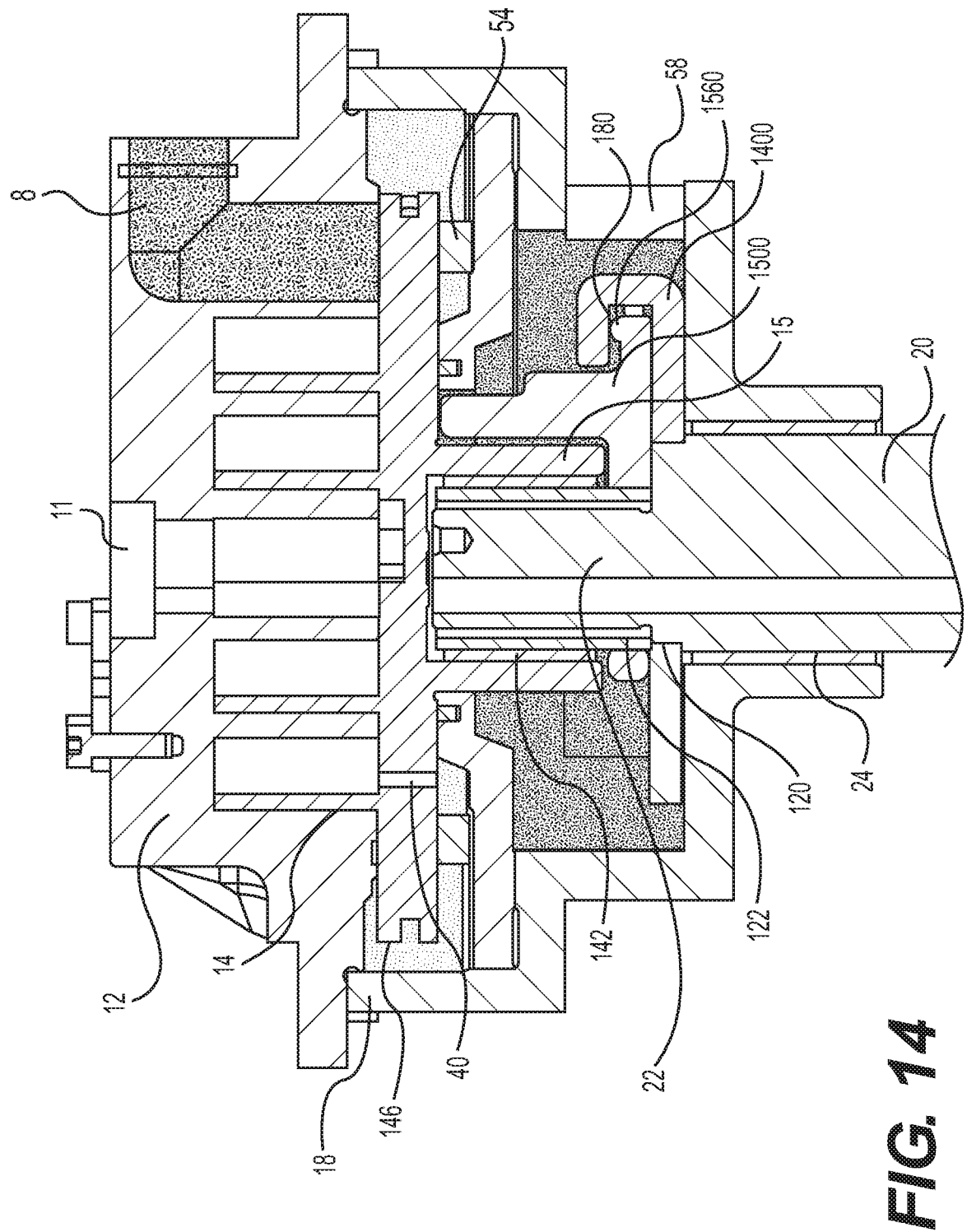
FIG. 14 illustrates an example of a portion of a cross-sectional view of a scroll compressor according to some implementations.

FIG. 14 illustrates an example of a portion of a cross-sectional view of a scroll compressor according to some implementations. Some elements shown in FIG. 14 may be the same or similar as those shown in previous Figures and therefore the description and interconnectivity of those elements may not be repeated herein. The elements shown in FIG. 14 may be a variation of the aforementioned elements. For example, FIG. 14 shows a counterweight 1500 and a counterweight guide plate 1400. FIG. 14 exemplifies a different structure of the counterweight 1500 from the compliant counterweight described above, to minimize the counterweight moment, and the features required for stable operation. The center of mass of the counterweight 1500 this part has been raised, to be closer to the orbiting scroll center of mass. In addition, the lower section of the counterweight 1500 has a larger swing radius compared to that of the compliant counterweight described above. The counterweight 1500 extends as much mass upward as possible, including the space between the axial compliance seal plate 40 and the orbiting scroll hub 15 for the orbiting scroll bearing 142.

Figure 15:
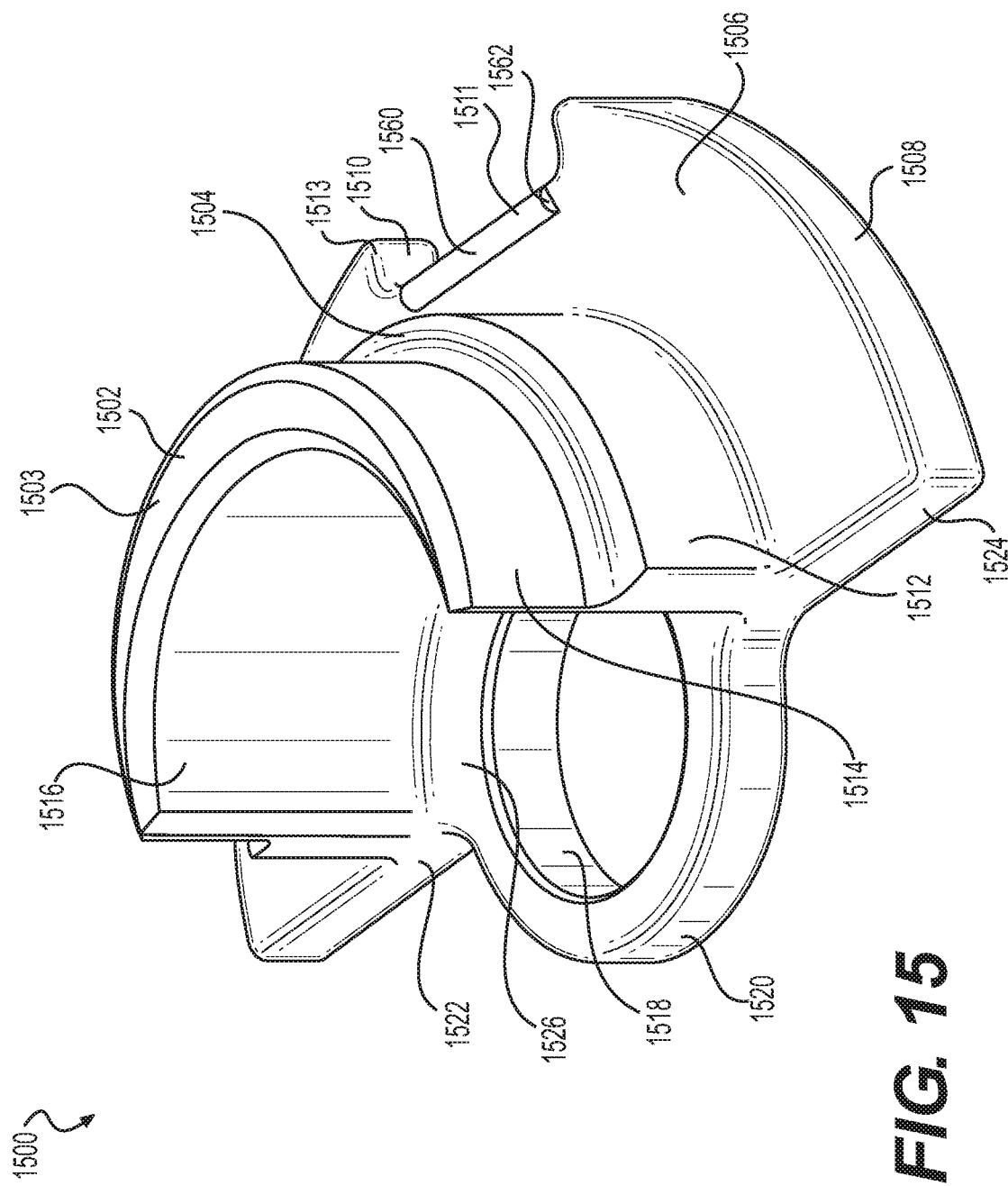
FIG. 15 illustrates an example of a perspective view of a counterweight according to some implementations.

FIG. 15 illustrates an example of a perspective view of a counterweight according to some implementations. According to some implementations the counterweight 1500 includes a base surface 1506, an intermediate outward facing surface 1512, an upper outward facing surface 1514, and a top rim 1502. The base surface 1506 may extend in the radial direction in semi-circular or curved shape outwardly. In some examples, the base surface 1506 is flat and smooth and is perpendicular to the main axis 21. Disposed in the base surface 1506 may also include a notched or cut out portion 1510. The cutout portion 1510 may include a flat outward facing surface 1511 and a pair of flat facing surfaces 1513 that face each other across the flat outward facing surface 1511. Further, extending downward and, in some cases, perpendicular to the base surface 1506 is a lower outer facing surface or edge 1508.

In some implementations, extending upward in the axial direction and, in some instances, perpendicular to the base surface 1506 and around an inner portion of the base portion 1506 is an intermediate outward facing surface 1512. The intermediate outward facing surface 1512 faces outward and extends less, in the radial direction, than the lower outward facing surface 1508. Extending inward in the radial direction, and in some cases, perpendicular to the intermediate outward facing surface 1512 and around the intermediate outward facing surface 1512 is an intermediate rim or upward facing surface 1504. The intermediate rim 1504 may have a flat and/or smooth surface and may be parallel to the base surface 1506. In some implementations, an upper outward facing surface 1514 extends upward in the axial direction from the intermediate rim 1504 and, in some instances, is perpendicular to the intermediate rim 1504 and extends upward around the intermediate rim 1504. The upper outward facing surface 1514 faces outward and extends, less in the radial direction, than the intermediate outward facing surface 1512. Further, in some implementations, extending inward in the radial direction, and in some cases, perpendicular to the upper outward facing surface 1514 and around the upper outward facing surface 1514 is a to rim or upward facing surface 1502. The top rim 1502 may have a flat and/or smooth surface and may be parallel to the base surface 1506. In some examples and as shown in FIG. 15, respective portions of the top rim 1502, intermediate rim 1504, and base surface 1506 may be thicker than the rest of the respective portions in the radial direction. For example, a portion of the top rim 1503 may be thicker in the radial direction than another portion of the top rim 1502. Additionally, in some implementations, the top rim 1502 may be higher than the intermediate rim 1504, which may be higher than the base surface 1506 in the axial direction. FIG. 14 also shows that the top rim 1502 extends essentially an axial length of the orbiting scroll hub 15 and may extend to upward until just below the base plate of the orbiting scroll. The base surface 1506 may include a rounded bump or protrusion 1560 extending upward from the base surface 1506. In some implementations, the protrusion or bump 1560 may be square or flat, or triangular such that one surface of the triangular bump or protrusion 1560 is parallel and contiguous with respect to the outward facing surface 1511. In an implementation where the protrusion or bump 1560 is rounded, the shape may be semi-circular. Further, in some examples, the protrusion or bump 1560 may not span an entire width of the cut out portion 1510.

Figure 16:
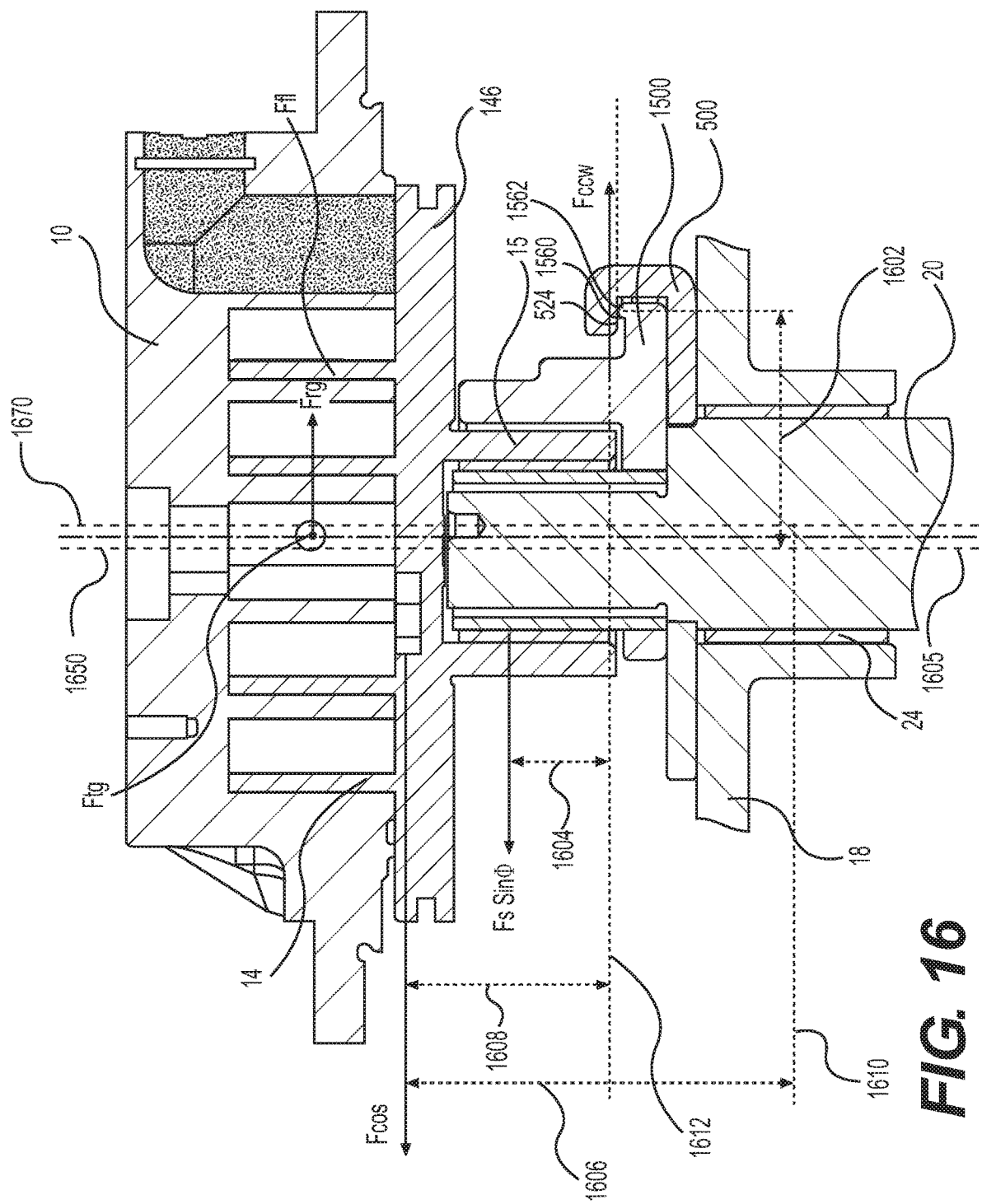
FIG. 16 illustrates an example of various forces during operation according to some implementations.

FIG. 16 illustrates an example of a portion of a cross-sectional view of a scroll compressor according to some implementations. In FIG. 16, Ftg is a tangential gas force; F cos is a centrifugal force of the orbiting scroll 14; Frg is a radial gas force; Ffl is a flank force, which may indicate the contact force between the walls of the involutes; Fccw is the centrifugal force of the compliant counterweight 1500; and Fs Sin Φ is the component of compression force from the shaft 20, based on the drive angle Φ. Reference number 1605 represents the centerline of the orbiting scroll bearing 142.

Additionally, Fs Sin Φ is the component of compression force from the shaft 20, based on the drive angle Φ, with a moment arm 1604 from the Fccw force. As mentioned above, Fccw is on the center of mass of the compliant counterweight 1500, with a moment arm 1608 from the F cos center of mass of the orbiting scroll 14. FIG. 16 also shows a distance 1606 from an orbiting scroll 14 center of mass to a center of a main bearing 1610. Additionally, FIG. 16 shows a distance 1608 from the orbiting scroll center of mass to the compliant counterweight center of mass 1612. The distance 1608 may be less than 20-50% of the distance 1606.

FIG. 16 further shows that the counterweight guide plate 1400 also may be mounted or installed on the stepped diameter portion 120 of the main shaft similar to the counterweight guide plate 500 as described above. Reference number 1650 represents the centerline of the orbiting scroll bearing 142 and reference number 1670 represents the center of fixed scroll 10, center shell 6, and shaft 20. FIG. 16 also shows the bump or protrusion 1560. Further, a clearance or gap $D_g$ 180 may exist between the top surface of the protrusion or bump 1560 and the bottom surface 524. The line of contact of a top surface of the bump or protrusion 1560 and the lower surface 524 in addition to the center line of the orbiting scroll 1605 defines the moment arm 1602.

Figure 17:
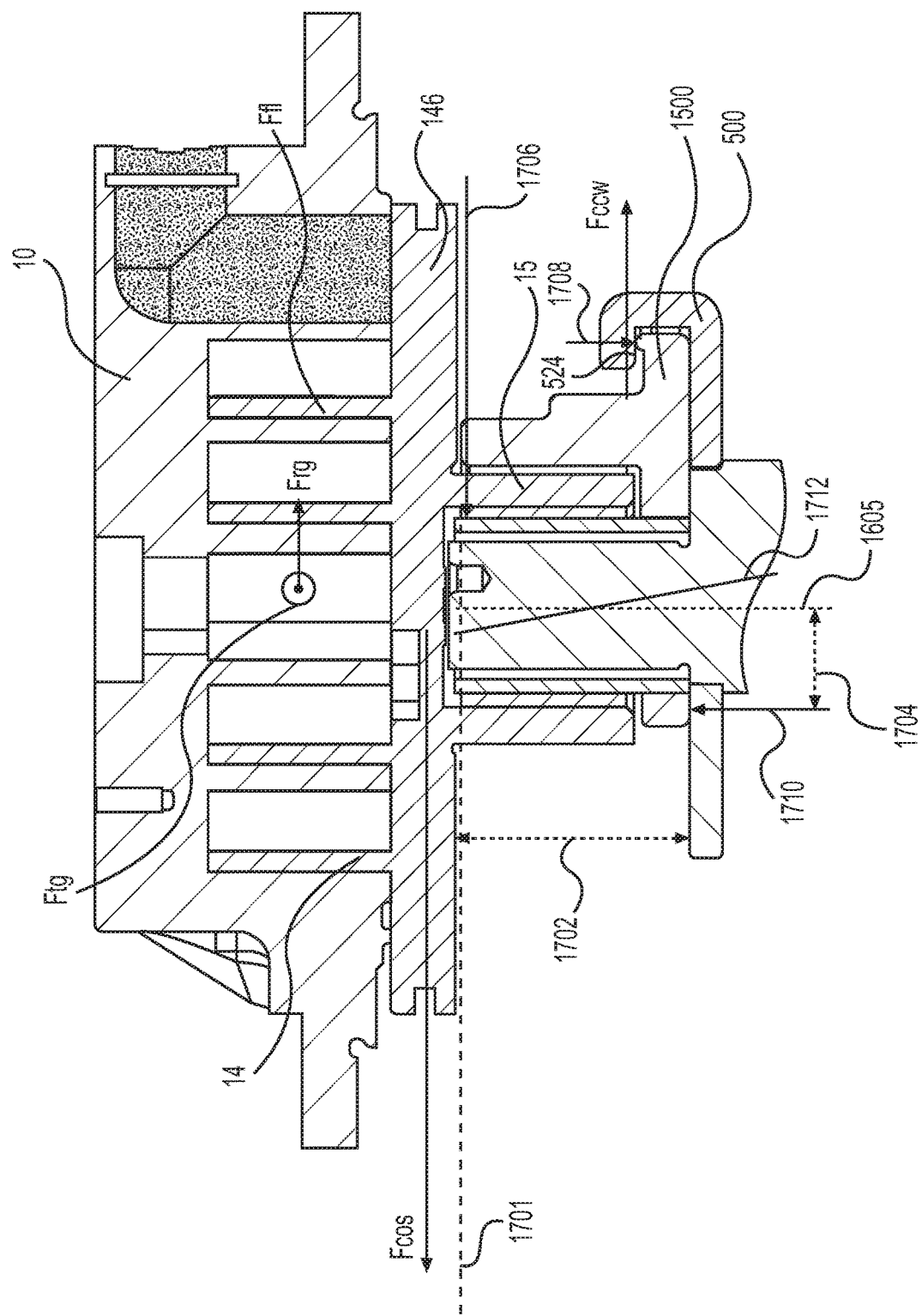
FIG. 17 illustrates an example of various forces according to some implementations.

FIG. 17 an example of various forces according to some implementations. At very high speeds the centrifugal force of the orbiting scroll F cos force can become large enough to cause a significant tilt in the orbiting scroll and its bearing 142. The force F1 1706 is produced by F cos, and is concentrated on the upper edge of the orbiting scroll bearing length, referenced as 1702. Dashed line 1701 represents a top of the orbiting scroll bearing 142. Dashed line 1702 represents a dimension from the top surface 502 of the guide plate to the top of the orbiting scroll bearing 142. The angle of tilt of the orbiting scroll bearing may be defined as θ. If this angular tilt reaches a critical value, the hydrodynamic oil film which lubricates a journal bearing, can be minimized to the point of failure. The 1706 force may be greatly reduced because of the compliant counterweight balancing technique. In addition, the force F2 1708 produced at the guide plate ensures that θ does not reach the critical value. Both forces produce moments in the opposite direction, but with different moment arms; and this is important to the implementations shown. Further, upon tilting, the counterweight may contact the upper surface of the guide plate at 1710.

For example, a summation of these moments is:

$$F1*D_3 = F2*(D_2+D_4) \quad \text{EQ3}$$

$D_3$ represents distance 1608, $D_2$ represents distance 1602, and $D_4$ represents distance 1704.

The following calculations describe how the parameters affect this optimization.

$$\Theta \approx \tan\Theta = \frac{D_1}{D_2} \quad \text{EQ4}$$

θ represents the angle or tilt of the orbiting scroll bearing and $D_1$ represents distance 180 and $D_2$ represents distance 1602.

$$F2 = \frac{T}{D_2} \approx \frac{M_{OS}\omega^2 R_{or} \cdot D_3}{D_2} \quad \text{EQ5}$$

T represents the torque produced by a mass of the orbiting scroll bearing 142, $D_2$ represents distance 1602, $M_{os}$ represents the mass of the orbiting scroll 14, ω represents angular rotation speed squared, $R_{or}$ represents the radius of the orbiting scroll which may be defined by the involute parameters, and $D_3$ represents the distance 1608.

Further, optimization is prove by the following:

$$D_3 < D_5 \text{ and } D_2 > D_6 \quad \text{EQ6}$$

$D_5$ represents distance 902 and $D_6$ represents distance 903.

Figure 18:
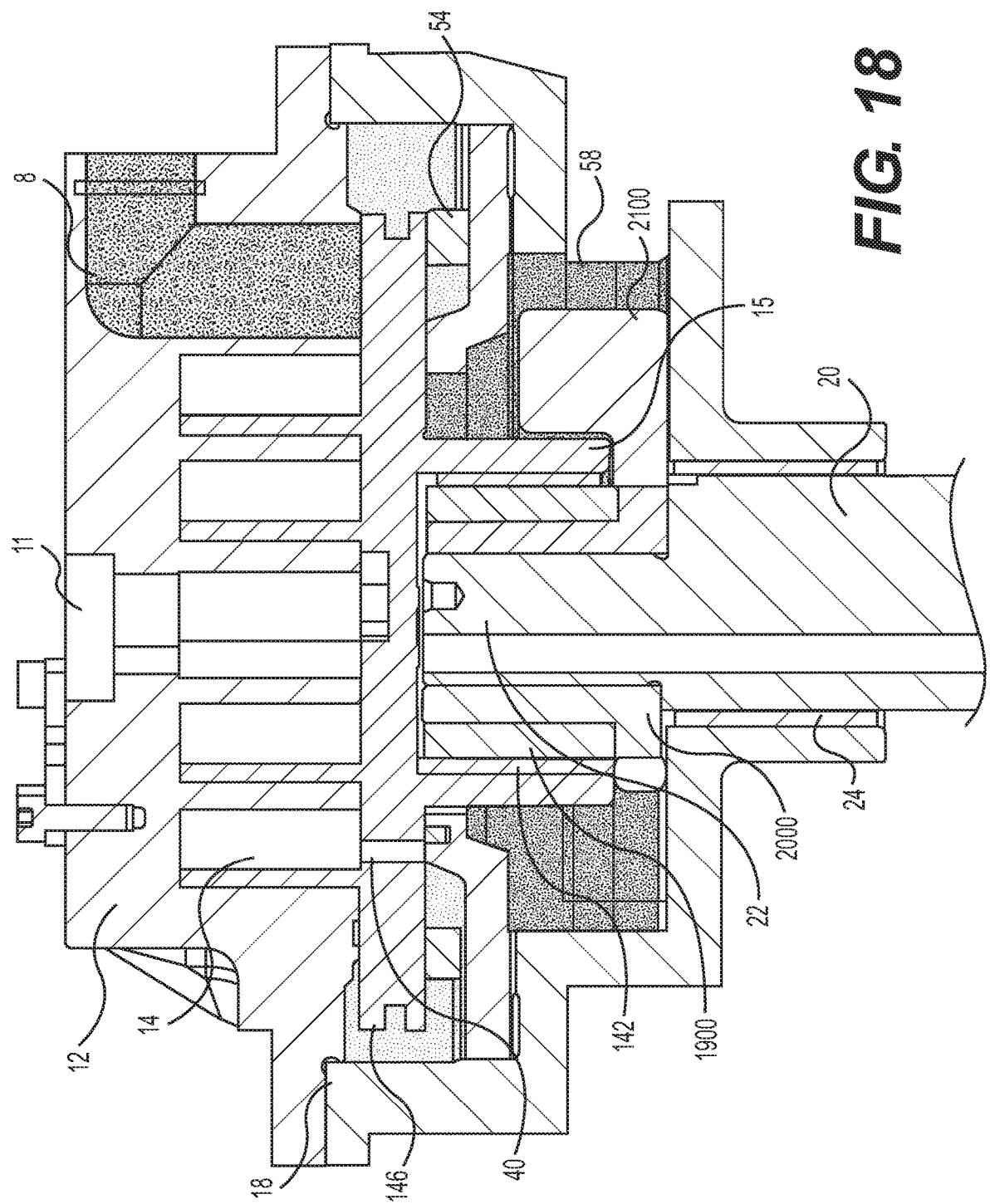
FIG. 18 illustrates an example of a portion of a cross-sectional view of a scroll compressor according to some implementations.

FIG. 18 illustrates an example of a portion of a cross-sectional view of a scroll compressor according to some implementations. Some elements shown in FIG. 18 may be the same or similar as those shown in previous Figures and therefore the description and interconnectivity of those elements may not be repeated herein. The elements shown in FIG. 18 may be a variation of the aforementioned elements. For example, FIG. 18 shows a journal ring 1900, a barreled slider block 2000 and a compliant counterweight 2100, which further improve the reliability of the orbiting scroll bearing at very high speeds, for example. As mentioned above, at high speeds, the orbiting scroll mass causes deflection in the bearing assembly, which includes the slider block and bearing insert. As shown in FIG. 18, the orbiting scroll 14 has been adapted for a larger diameter bearing assembly, which may be a reduced length compared to previous examples. In other words, the bearing assembly diameter is increased to make room for the addition of the journal ring 1900. In order to offset the increased power consumption, the bearing assembly may be reduced in length, for example.

Figure 19:
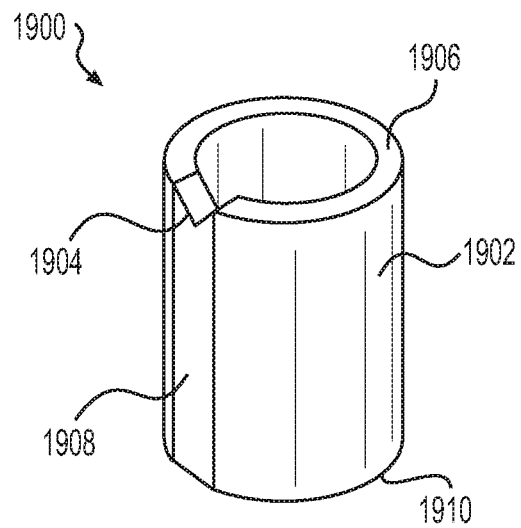
FIG. 19 illustrates an example of a perspective view of a journal ring according to some implementations.

FIG. 19 illustrates an example of a journal ring according to some implementations. As shown in the example of FIG. 19, a journal bearing 1900 has an oil notch disposed in the top rim 1906 and outer surface 1902. An oil delivery flat 1908 is also disposed in the outer surface 1902. The journal ring has a cylindrical inside bore that is a slip fit over a barreled slider block 2000. The radial position of the flat section 1908 on the journal portion of the slider block 2000 may be located relatively on the opposite side that supports the high compression load. This vector load rotates continuously around the journal surface 1902, and scroll pocket compression advances. The oil produces a high pressure hydrodynamic oil film that maintains a required minimum clearance between the journal surface 1902 and the bearing surface, and provides the necessary lubrication.

Figure 20:
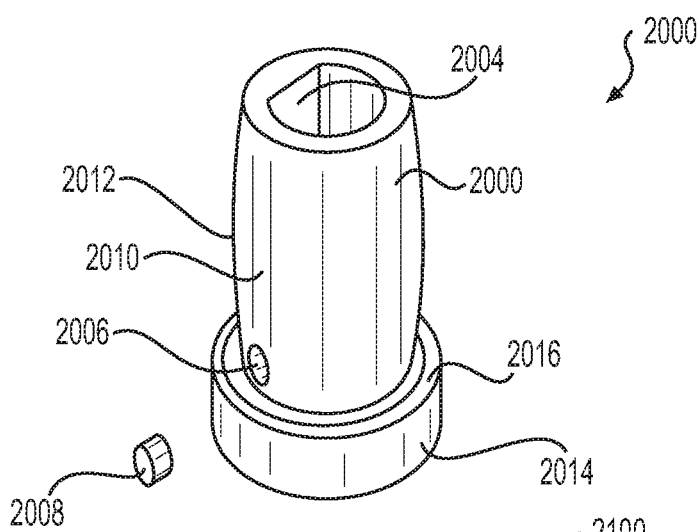
FIG. 20 illustrates an example of a barreled slider block according to some implementations.

FIG. 20 illustrates an example of a barreled slider block according to some implementations. As shown in FIG. 20, the barreled slider block 2000 may be a single piece and includes a drive flat 2004. It could be formed from a sintered material, machined, hardened, and the barrel surface precision ground. In some implementations, a base 2014 may be provided to extend the base diameter of the barreled slider block 2000. The outside surface 2010 of the barreled slider block 2000 is a crowned-barrel shape that is slightly larger in diameter in the center. The estimated peak of this barrel shape diameter could be from 20-50 microns or have a barrel radius of approximately 250 mm. The barreled slider block 2000 may be press fit into the compliant counterweight 2100. In some implementations herein a journal ring 1900 fits between the barreled slider block 2000 and the orbiting scroll bearing 142. As mentioned above, the journal ring 1900 may have a cylindrical inside bore that is a slip fit over the barreled slider block 2000. The bottom end 1910 of the journal ring 1900 may rest against the top end of the barreled slider block base 2016. Alternatively, the bottom end 1910 can rest against a top portion of compliant counterweight 2100. In some implementations, the journal ring 1900 does not spin around the barreled slider block 2000. A pin may be inserted in the bottom edge of the journal ring 1902 and a slot formed in the corresponding upper surface of the barreled slider block 2000 base to prevent spin. In some implementations, the barreled slider block base 2014 is a larger diameter than an aforementioned slider block; and therefore the bore in the compliant counterweight 2102 must be adapted to this diameter. Further, as shown in FIG. 20, an anti-rotation pin 2008 may be inserted into a hole in the outer surface 2010.

Figure 21:
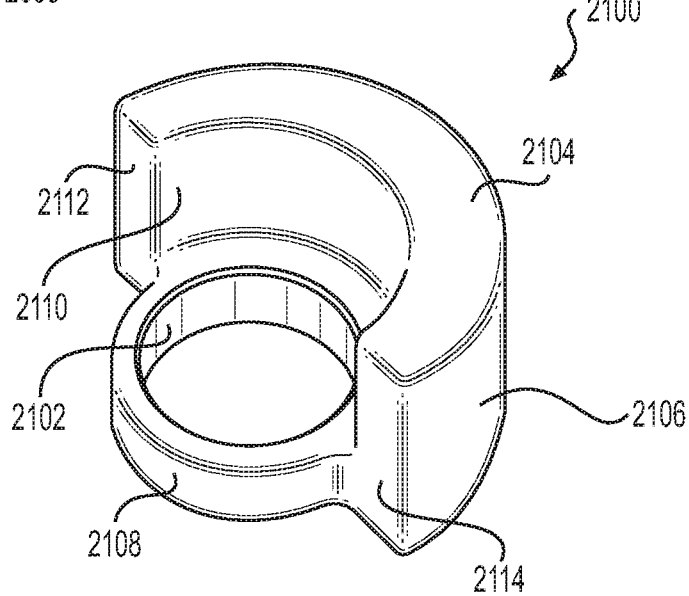
FIG. 21 illustrates an example of a compliant counterweight according to some implementations.

FIG. 21 illustrates an example of a compliant counterweight according to some implementations. A main body of the compliant counterweight 2100 may essentially have a C shape having an outer diameter surface 2106 and a first end face 2112 and a second end face 2114 that may be 180° from each other. In some examples, an inner curved surface 2110 of the C-shaped compliant counterweight 2100 may be essentially circular (or half-circular) or may be curved and may have a smooth surface. In some examples, the upper surface 2104 may be flat and perpendicular to the main axis 21. Further, a lower flat portion may have an outer rim portion 2108 extending in the radial direction beyond the end faces 2112, 2114. As mentioned above, a bore for the crowned or barreled slider block 2102 may be provided in a base portion of the compliant counterweight 2100.

Figure 22:
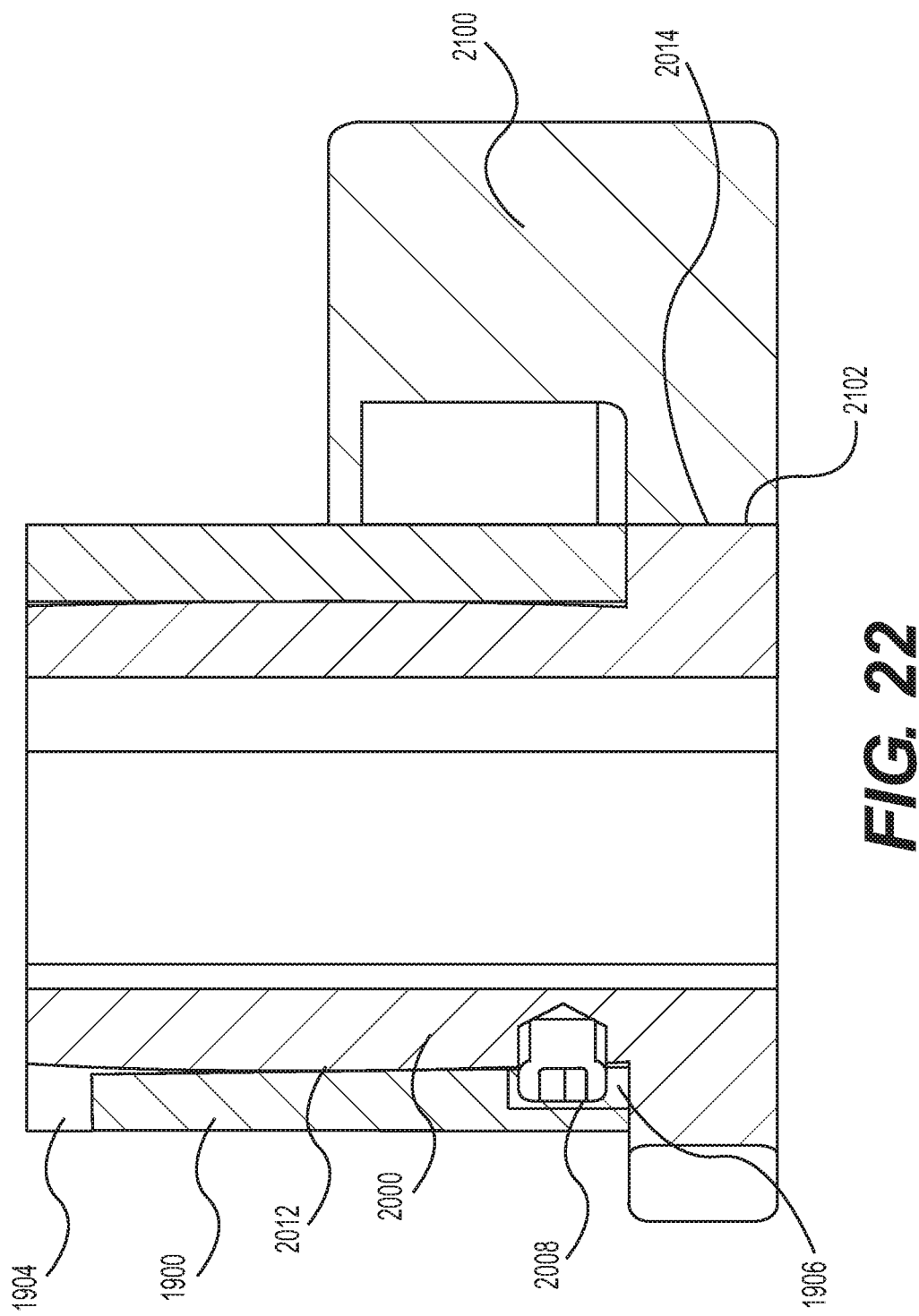
FIG. 22 illustrates an example of a portion of a cross-sectional view of a scroll compressor according to some implementations.

FIG. 22 illustrates an example of a portion of a cross-sectional view of a scroll compressor according to some implementations. As shown in the implementation of FIG. 22, the barreled slider block base 2014 may fit into the bore 2102 of the compliant counterweight 2100. The anti-rotation pin 2008 may be above the base surface of the compliant counterweight 2100 in the axial direction. As further show, the journal ring 1900 is fit over the outer diameter surface 2010 of the barreled slider block and the slider block base 2014 is also shown to have an increased diameter with respect to the other portions of the barreled slider block 2000.

According to the assembly shown in FIG. 22, adverse deflection of the orbiting scroll 14 and its subsequent bearing could be prevented, with respect to the journal surface it spins against. If the orbiting scroll 14 deflects due to centrifugal force at very high speeds, the journal ring 1900 will simply deflect in much the same way; pivoting on the crown of the barreled slider block 2012. The important lubrication bearing film between the journal ring 1900 and the orbiting scroll bearing 142 will have very limited disturbance.

Figure 23:
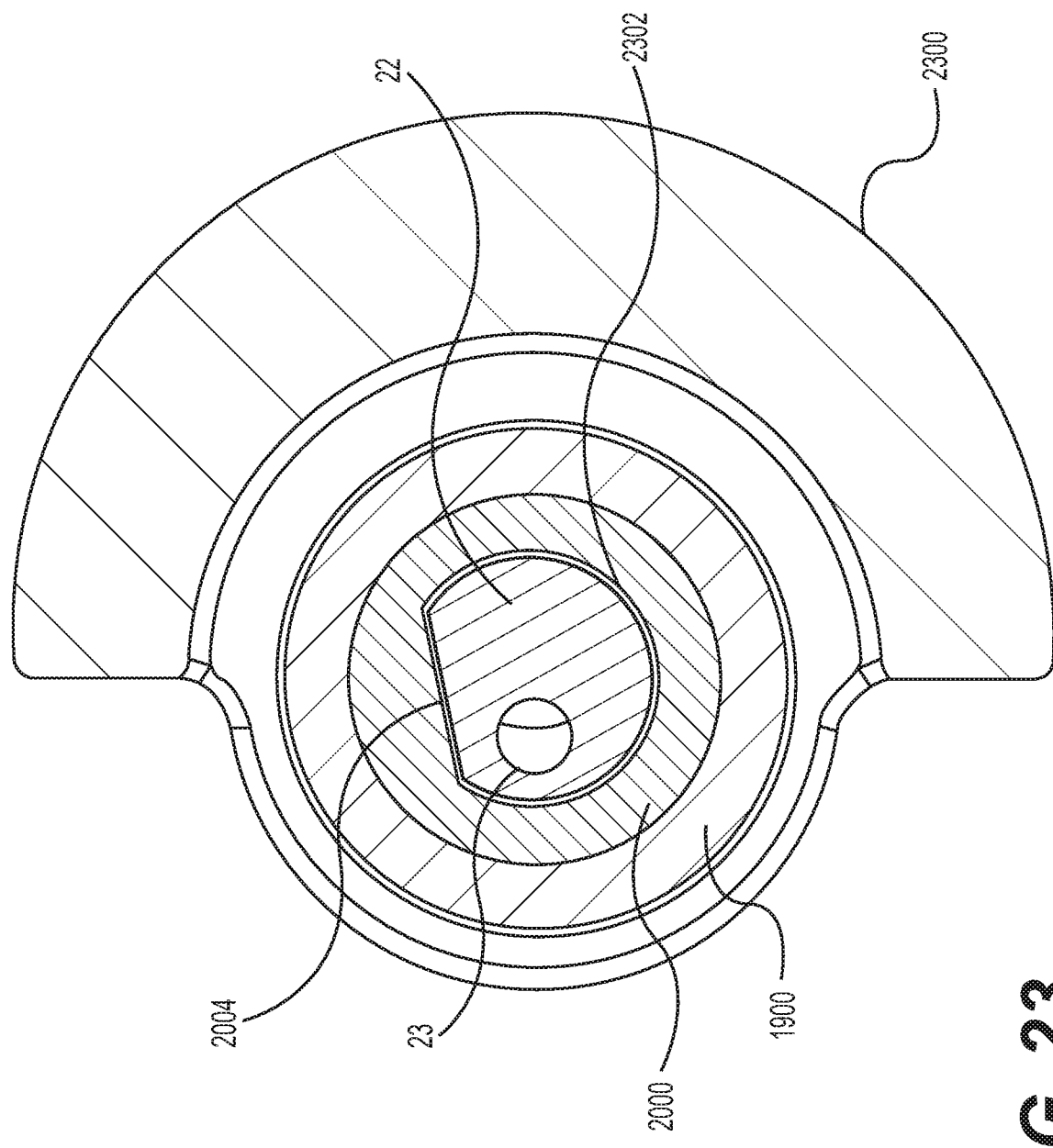
FIG. 23 illustrates an example of a top view of a portion of a scroll compressor according to some implementations.

FIG. 23 illustrates an example of a top view of a portion of a scroll compressor according to some implementations. FIG. 23 shows the configuration and engagement of the barreled slider block 2000 with the journal ring 1900. FIG. 23 further shows, for example, the drive flat 2004 of the barreled slider block 2000 and a clearance or a gap 2302 between the barreled slider block 2000 and the shaft eccentric 22.

Figure 24:
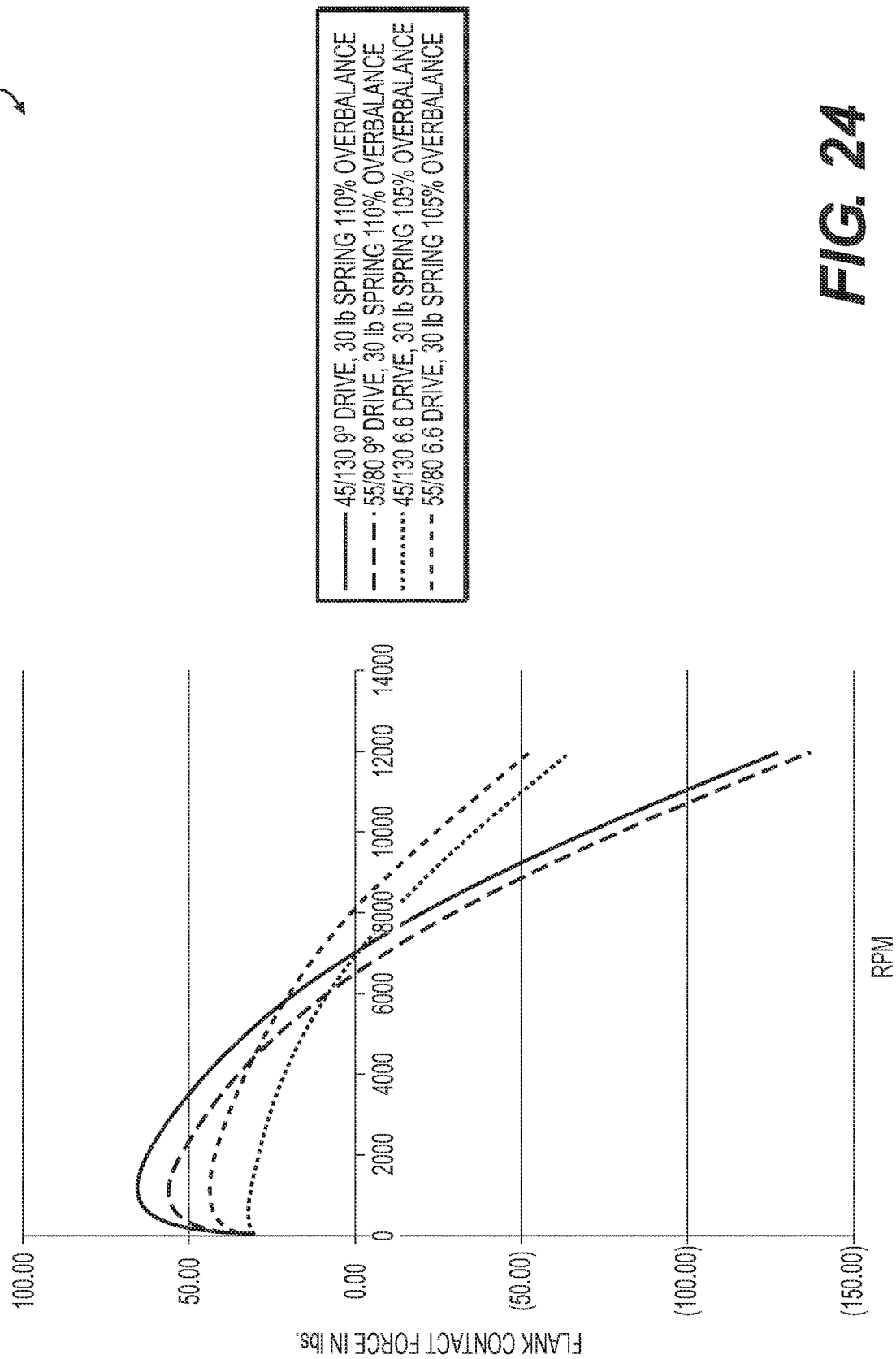
FIG. 24 illustrates an example of a graph indicating a flank contact force with respect to revolutions per minute (RPM) of a compressor according to some implementations.

FIG. 24 illustrates an example of a graph 2400 indicating a flank contact force with respect to revolutions per minute (RPM) of a compressor according to some implementations. For example, in a compressor which includes a spring assembly such as the spring assembly 1002 described above, there is a certain flank force of the involutes of the orbiting scroll 14 and fixed scroll 10 between the flanks at startup with the spring force, then at higher speeds, for example, between 6000 and 9000 RPM, the flanks separate to run with a small clearance between the walls. In some implementations, the clearance may be 10-40 microns. The small clearance may be determined by tolerances and sizes of the clearances in the shaft offset, eccentric, slider block, and bearing clearances. So at higher speeds the noise would be reduced by eliminating wall contact, and efficiency (leakage losses) would be offset by relatively higher oil circulation rates.

In some instances a range of 4°-15° of slider block drive angle along with a range of 105-115% overbalancing (wherein the center mass of the compliant counterweight exceeds the center of mass of the orbiting scroll by 105-115%) in combination with a biasing spring force of 20-80 lbs to cause scroll separation at an RPM between 5000-9000 RPM over the operating envelope of conditions. For example, as shown in graph 2300, for different combinations of drive angle, spring force, and compliant counterweight overbalancing, the flank contact force may become negative at high speeds causing a small clearance between the walls of the flanks. The graph 2300 also indicates saturated temperature operating conditions of an air-conditioning system incorporating a compressor, such as 45/130; 55/80; 45/130; and 55/80.

The processes described herein are only examples for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A scroll compressor, comprising:
   a drive shaft extending along a main axis including a shaft eccentric having a smaller diameter than a diameter of the drive shaft;
   a slider block disposed on the shaft eccentric;
   an orbiting scroll disposed on the slider block having a base plate and a spiral wrap extending axially from the orbiting scroll base plate;
   a fixed scroll having a base plate, a spiral wrap extending axially from the fixed scroll base plate and nested with the spiral wrap of the orbiting scroll;
   a counterweight having a bore that engages with the slider block;
   a counterweight guide plate supporting the counterweight and having a bore that engages with the drive shaft,
   wherein the counterweight includes a first surface perpendicular to the main axis that faces upward, and
   wherein the counterweight guide plate includes a second surface perpendicular to the main axis and parallel to the first surface and that faces the first surface.

2. The scroll compressor of claim 1,
   wherein the counterweight guide plate includes an arm extending upward in an axial direction that includes a radially inward extending portion that extends over a portion of the counterweight that includes the first surface,
   wherein the radially inward extending portion includes the second surface, and
   wherein the first surface includes a protrusion facing the second surface.

3. The scroll compressor of claim 2,
   wherein a portion of the counterweight guide plate that is opposite the arm from the bore of the counterweight guide plate extends outward in a radial direction beyond the counterweight in the radial direction.

4. The scroll compressor of claim 1,
   wherein the counterweight includes an essentially semi-circular a top surface above the bore in the axial direction and two essentially flat end faces perpendicular to the top surface,
   wherein an outer diameter surface is disposed in a circumferential direction around a portion of an outer diameter of the counterweight and intersects each of the two essentially flat end faces, and
   wherein the first surface is disposed within a cutout portion of the top surface and outer diameter surface and the first surface is disposed lower than the top surface in the axial direction.

5. The scroll compressor of claim 4,
wherein the outer diameter surface of the counterweight faces an inward facing surface of a vertically extending portion of the arm of the counterweight guide plate.

6. The scroll compressor of claim 4,
wherein an elastic member is disposed in a hole in the outer diameter surface of the counterweight that is disposed underneath the first surface and imparts a force in a radial direction, and
wherein an upward extending portion of the arm of the counterweight guide plate includes a hole that includes an adjustment mechanism for adjusting a tension of the elastic member.

7. The scroll compressor of claim 6,
wherein the elastic member is a spring assembly.

8. The scroll compressor of claim 7,
wherein a center mass of the counterweight exceeds the center of mass of the orbiting scroll by 105 to 115%,
wherein a drive angle, which is a relationship of a drive flat of the shaft eccentric and the eccentric offset, is in a range of 4 to 15 degrees,
wherein a spring force of the spring has a force within a range of 20-80 lbs, and
wherein the spiral wraps of the orbiting scroll and the fixed scroll have flanks that are separated from one another by a small clearance when the shaft speed is in the range of 6000 to 9000 revolutions per minute (RPM).

9. The scroll compressor of claim 1,
wherein a bottom surface portion of the counterweight contacts a portion of a top surface of the counterweight guide plate.

10. The scroll compressor of claim 1,
wherein an axial end of a hub of the orbiting scroll is disposed lower than the first surface of the counterweight in the axial direction.

11. The scroll compressor of claim 1,
wherein the counterweight and counterweight guide plate are disposed above a main bearing of the drive shaft in the axial direction.

12. The scroll compressor of claim 1,
wherein the drive shaft includes a stepped diameter portion below the shaft eccentric that has a diameter less than that of a remaining portion of the drive shaft and greater than a diameter of the shaft eccentric, and
wherein the bore of the counterweight guide plate is disposed on the stepped diameter portion of the drive shaft.

13. The scroll compressor of claim 1,
wherein an axial distance from a center mass of the orbiting scroll to a center mass of the counterweight is less than half of an axial distance from the center mass of the orbiting scroll to a center of a main bearing, which is disposed below the counterweight guide plate.

14. The scroll compressor of claim 1,
wherein the counterweight guide plate includes an arm extending upward in an axial direction that includes a radially inward extending portion that extends over a portion of the counterweight that includes the first surface,
wherein the radially inward extending portion includes the second surface, and
wherein a hole is disposed in the radially inward extending portion of the arm and a screw is disposed in the hole such that a clearance between an axial end of the screw and the first surface is adjusted based on a position of the screw.

15. The scroll compressor of claim 1,
wherein the orbiting scroll is made of a ductile iron and the fixed scroll is made of a cast iron.

16. The scroll compressor of claim 1,
wherein the counterweight comprises:
a top curved surface portion disposed at first radius;
an intermediate curved surface portion disposed at a second radius, greater than the first radius, and disposed lower than the top curved surface portion; and
a lower curved surface portion disposed at a third radius, greater than the second radius, and disposed lower than the intermediate curved surface portion, and
wherein the first surface is disposed in the lower curved surface portion.

* * * * *